(12) United States Patent
Smith et al.

(10) Patent No.: US 9,463,833 B2
(45) Date of Patent: *Oct. 11, 2016

(54) ALIGNMENT RESTORATION DEVICE FOR LOAD TRANSPORTING APPARATUS

(71) Applicant: Entro Industries, Inc., Hillsboro, OR (US)

(72) Inventors: Shawn R. Smith, Hillsboro, OR (US); Harlan B. Smith, Beaverton, OR (US)

(73) Assignee: ENTRO INDUSTRIES, INC., Hillsboro, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/094,664

(22) Filed: Apr. 8, 2016

(65) Prior Publication Data

US 2016/0221620 A1 Aug. 4, 2016

Related U.S. Application Data

(63) Continuation of application No. 14/529,566, filed on Oct. 31, 2014, which is a continuation-in-part of application No. 13/909,969, filed on Jun. 4, 2013, now Pat. No. 9,096,282, which is a continuation-in-part of application No.

(Continued)

(51) Int. Cl.
   *B62D 51/06* (2006.01)
   *B62D 57/02* (2006.01)
   (Continued)

(52) U.S. Cl.
   CPC .............. *B62D 57/02* (2013.01); *B62D 57/032* (2013.01); *E21B 15/003* (2013.01); *E21B 15/006* (2013.01)

(58) Field of Classification Search
   CPC .... B62D 57/00; B62D 57/02; B62D 57/022; B62D 57/032
   USPC .......................................... 180/8.1, 8.5, 8.6
   See application file for complete search history.

(56) References Cited

U.S. PATENT DOCUMENTS

| 1,001,299 | A | 8/1911 | Page |
| 1,242,635 | A | 10/1917 | Anderson |

(Continued)

FOREIGN PATENT DOCUMENTS

| CH | 359422 | 1/1962 |
| CN | 1515477 A | 7/2003 |

(Continued)

OTHER PUBLICATIONS

Schwabe Williamson & Wyatt, PC "Listing of Related Cases" dated Mar. 23, 2016; 1 page.

(Continued)

*Primary Examiner* — Joseph Rocca
*Assistant Examiner* — Conan Duda
(74) *Attorney, Agent, or Firm* — Schwabe, Williamson & Wyatt

(57) ABSTRACT

Embodiments of the present invention are directed to a load transporting apparatus that automatically aligns a support foot of the apparatus with a load-bearing frame connected to the load transporting apparatus during a recovery phase of an incremental walking movement. In particular, the load transporting apparatus includes a linking device attached to a support foot of the apparatus and a biasing device connected to the linking device that is deflected during non-linear load transporting movements, where the biasing device acts to automatically return the support foot to an aligned position relative to the load-bearing frame after a non-linear movement has been completed and the support foot is raised above a ground surface.

29 Claims, 29 Drawing Sheets

Related U.S. Application Data

13/711,193, filed on Dec. 11, 2012, now Pat. No. 8,573,334, and a continuation-in-part of application No. 13/711,269, filed on Dec. 11, 2012, now Pat. No. 8,561,733, and a continuation-in-part of application No. 13/711,315, filed on Dec. 11, 2012, now Pat. No. 8,490,724.

(60) Provisional application No. 61/757,517, filed on Jan. 28, 2013, provisional application No. 61/576,657, filed on Dec. 16, 2011.

(51) Int. Cl.
  *E21B 15/00* (2006.01)
  *B62D 57/032* (2006.01)

(56) References Cited

U.S. PATENT DOCUMENTS

| | | | |
|---|---|---|---|
| 1,879,446 A | 2/1931 | Page | |
| 2,132,184 A | 10/1937 | Poche | |
| 2,259,200 A | 10/1941 | Cameron | |
| 2,290,118 A | 7/1942 | Page | |
| 2,541,496 A | 2/1951 | Busick, Jr. | |
| 2,914,127 A | 8/1955 | Ricouard | |
| 2,777,528 A | 1/1957 | Jourdain | |
| 2,942,676 A | 6/1960 | Kraus | |
| 3,113,661 A | 12/1963 | Linke | |
| 3,135,345 A | 6/1964 | Scruggs | |
| 3,249,168 A | 5/1966 | Klein | |
| 3,255,836 A | 6/1966 | Hoppmann | |
| 3,334,849 A | 8/1967 | Bronder | |
| 3,362,553 A | 1/1968 | Weinmann | |
| 3,446,301 A | 5/1969 | Thomas | |
| 3,512,597 A | 5/1970 | Baron | |
| 3,527,313 A * | 9/1970 | Reimann | B62D 57/02 180/8.5 |
| 3,528,341 A | 9/1970 | Rieschel | |
| 3,576,225 A | 4/1971 | Chambers | |
| 3,638,747 A | 2/1972 | Althoff | |
| 3,754,361 A | 8/1973 | Branham | |
| 3,807,519 A | 4/1974 | Patch | |
| 3,853,196 A | 12/1974 | Guest | |
| 3,866,425 A | 2/1975 | Morrice | |
| 3,921,739 A | 11/1975 | Rich | |
| 4,014,399 A | 3/1977 | Ruder | |
| RE29,541 E | 2/1978 | Russell | |
| 4,135,340 A | 1/1979 | Cox | |
| 4,290,495 A | 9/1981 | Elliston | |
| 4,296,820 A | 10/1981 | Loftis | |
| 4,324,077 A | 4/1982 | Woolslayer | |
| 4,324,302 A * | 4/1982 | Rabinovitch | B62D 57/00 180/8.5 |
| 4,371,041 A | 2/1983 | Becker | |
| 4,375,892 A | 3/1983 | Jenkins | |
| 4,759,414 A | 7/1988 | Willis | |
| 4,821,816 A | 4/1989 | Willis | |
| 4,823,870 A | 4/1989 | Sorokan | |
| 4,831,795 A | 5/1989 | Sorokan | |
| 5,248,005 A | 9/1993 | Mochizuki | |
| 5,492,436 A | 2/1996 | Suksumake | |
| 5,575,346 A | 11/1996 | Yberle | |
| 5,794,723 A | 8/1998 | Caneer | |
| 5,921,336 A | 7/1999 | Reed | |
| 6,202,774 B1 | 3/2001 | Claassen | |
| 6,203,247 B1 | 3/2001 | Schellstede | |
| 6,474,926 B2 | 11/2002 | Weiss | |
| 6,554,145 B1 | 4/2003 | Fantuzzi | |
| 6,581,525 B2 | 6/2003 | Smith | |
| 6,612,781 B1 | 9/2003 | Jackson | |
| 7,182,163 B1 | 2/2007 | Gipson | |
| 7,308,953 B2 | 12/2007 | Barnes | |
| 7,681,674 B1 | 3/2010 | Barnes | |
| 7,806,207 B1 | 10/2010 | Barnes | |
| 7,819,209 B1 | 10/2010 | Bezner | |
| 7,882,915 B1 | 2/2011 | Wishart | |
| 8,051,930 B1 | 11/2011 | Barnes | |
| 8,250,816 B2 | 8/2012 | Donnally | |
| 8,468,753 B2 | 6/2013 | Donnally | |
| 8,490,724 B2 | 7/2013 | Smith | |
| 8,490,727 B2 | 7/2013 | Smith | |
| 8,556,003 B2 | 10/2013 | Souchek | |
| 8,561,733 B2 | 10/2013 | Smith | |
| 8,573,334 B2 | 11/2013 | Smith | |
| 8,646,976 B2 | 2/2014 | Stoik et al. | |
| 8,839,892 B2 | 9/2014 | Smith | |
| 8,887,800 B2 | 11/2014 | Havinga | |
| 2004/0211598 A1 | 10/2004 | Palidis | |
| 2004/0240973 A1 | 12/2004 | Andrews | |
| 2006/0027373 A1 | 2/2006 | Carriere | |
| 2006/0213653 A1 | 9/2006 | Cunningham | |
| 2009/0200856 A1 | 8/2009 | Chehade | |
| 2009/0283324 A1 | 11/2009 | Konduc | |
| 2011/0114386 A1 | 5/2011 | Souchek | |
| 2012/0219242 A1 | 8/2012 | Stoik et al. | |
| 2013/0153309 A1 | 6/2013 | Smith | |
| 2013/0156538 A1 | 6/2013 | Smith | |
| 2013/0156539 A1 | 6/2013 | Smith | |
| 2013/0277124 A1 | 10/2013 | Smith | |
| 2014/0014417 A1 | 1/2014 | Smith | |
| 2014/0054097 A1 | 2/2014 | Bryant | |
| 2014/0158342 A1 | 6/2014 | Smith | |
| 2014/0161581 A1 | 6/2014 | Smith | |

FOREIGN PATENT DOCUMENTS

| | | |
|---|---|---|
| DE | 2418411 | 10/1975 |
| DE | 4107314 A | 9/1992 |
| EP | 469182 | 10/1990 |
| GB | 2315464 | 2/1998 |
| WO | 2004103807 | 12/2004 |
| WO | 2006100166 A1 | 9/2006 |
| WO | 2010136713 | 12/2010 |

OTHER PUBLICATIONS

Entro Industries, Inc. brochure "The Future of Rig Walkers", Jun. 2012, 4 pages.

Columbia Industries LLC brochure "Kodiak Cub Rig Walking System", 2009, 4 pages.

Notice of Pending Litigation Under 37 CFR 1.56 Pursuant to Granted Request for Prioritized Examination Under 37 CFR 1.102(e)(1), Jun. 28, 2016.

Defendants' First Amended Answer, Affirmative Defenses, and Counterclaims to Plaintiff's Complaint for Patent Infringement, Jun. 27, 2016, p. 9, Section 16.

Defendants' Answer, Affirmative Defenses, and Counterclaims to Plaintiff's Complaint for Patent Infringement, Jun. 6, 2016, p. 6, Section 2.

Schwabe Williamson & Wyatt, PC "Listing of Related Cases" dated Jun. 28, 2016.

Defendants' Second Amended Answer, Affirmative Defenses, and Counterclaims to Plaintiff's Complaint for Patent Infringement, Jul. 12, 2016, p. 9, Sections 15-18.

* cited by examiner

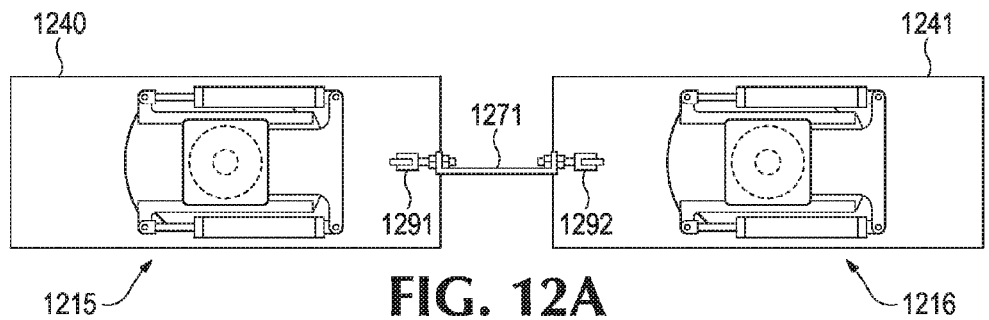
FIG. 12A
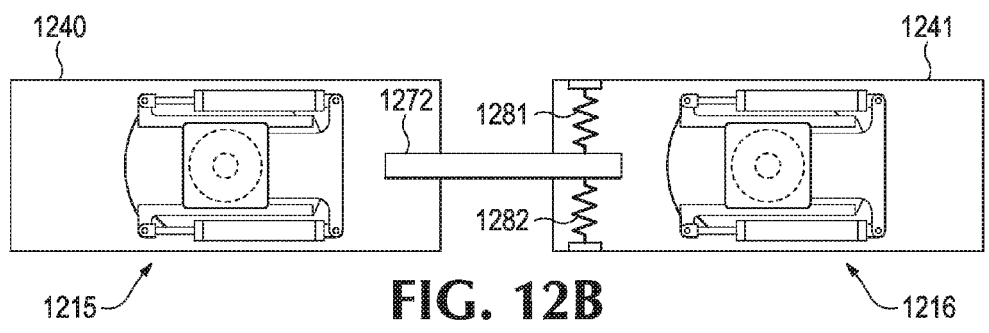
FIG. 12B
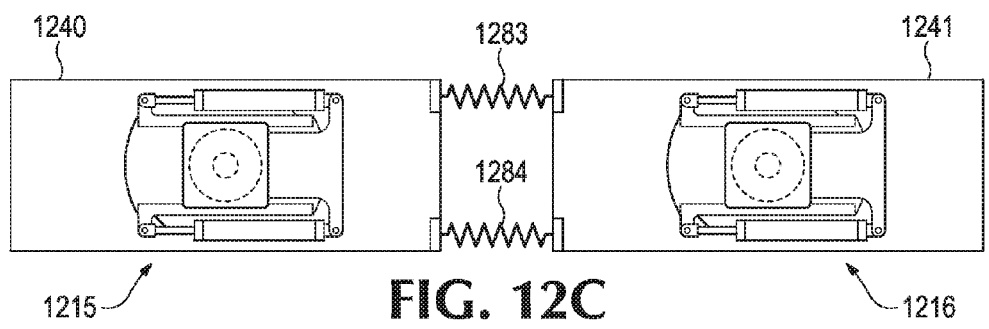
FIG. 12C
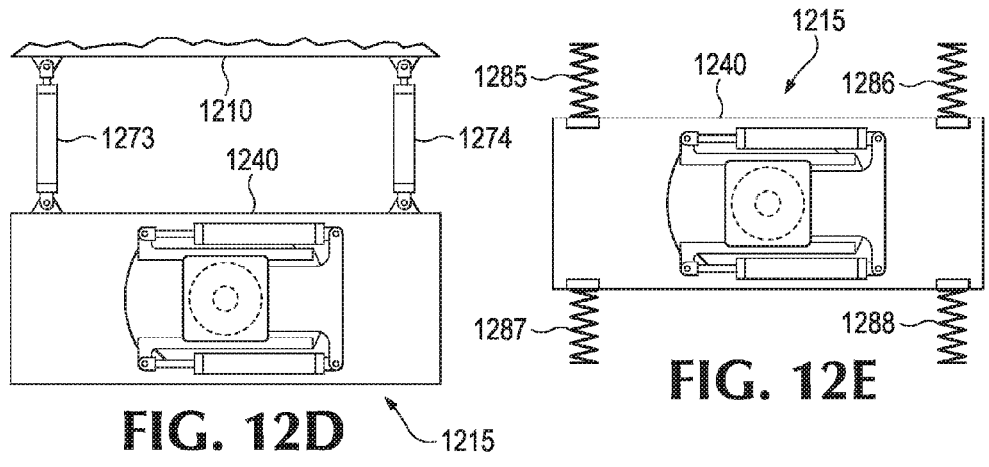
FIG. 12D
FIG. 12E

ALIGNMENT RESTORATION DEVICE FOR LOAD TRANSPORTING APPARATUS

STATEMENT OF RELATED MATTERS

This application claims priority to and is a continuation of U.S. patent application Ser. No. 14/529,566, filed Oct. 31, 2014. U.S. patent application Ser. No. 14/529,566 is a continuation-in-part of U.S. patent application Ser. No. 13/909,969, filed Jun. 4, 2013, now U.S. Pat. No. 9,096,282, issued Aug. 4, 2015, which claims priority to U.S. Provisional Application No. 61/757,517, filed Jan. 28, 2013.

U.S. patent application Ser. No. 13/909,969 is a continuation-in-part of U.S. patent application Ser. No. 13/711,193, filed Dec. 11, 2012, now U.S. Pat. No. 8,573,334, issued Nov. 5, 2013, which claims priority to U.S. Provisional Application No. 61/576,657, filed Dec. 16, 2011. U.S. patent application Ser. No. 13/909,969 is also a continuation-in-part of U.S. patent application Ser. No. 13/711,269, filed Dec. 11, 2012, now U.S. Pat. No. 8,561,733, issued Oct. 22, 2013, which claims priority to U.S. Provisional Application No. 61/576,657, filed Dec. 16, 2011. Additionally, U.S. patent application Ser. No. 13/909,969 is a continuation-in-part of U.S. patent application Ser. No. 13/711,315, filed Dec. 11, 2012, now U.S. Pat. No. 8,490,724, issued Jul. 23, 2013, which claims priority to U.S. Provisional Application No. 61/576,657, filed Dec. 16, 2011.

The contents of all the above patents and patent applications are herein incorporated by reference in their entireties.

TECHNICAL FIELD

This disclosure generally relates to systems, devices and methods for transporting a mounting structure configured to support a rig and/or a heavy load.

BACKGROUND

Moving extremely heavy loads has generally been a complicated task because of the large forces involved in lifting and transporting the heavy loads. In known mounting structures, large loads may be transported by disassembling or breaking up the load or the mounting structure into multiple smaller sections and/or loads. However, this breakdown and subsequent reassembly process can be very time consuming, especially when a heavy load is only to be moved a small distance, or needs to be repositioned.

For heavy loads that need periodic movement or adjustment, devices commonly referred to as "walking machines" or "walkers" were developed. These machines may be configured to move the heavy loads over small distances in incremental stages. For example, walking machines may be used to move large structures, such as oil rigs, in order to position them over pre-drilled pipes in oil fields.

Instead of using wheels driven by rotational forces to move heavy loads, walking machines typically use hydraulic lift cylinders to lift the load above a supporting surface, and then move or rotate the load relative to the supporting surface by transporting the load via rollers or tracks in the walking machines. U.S. Pat. No. 5,921,336 to Reed and U.S. Pat. No. 6,581,525 to Smith show two methods of using walking machines to move heavy loads, such as oil rig structures. The '525 patent shows elongated beams under several rollers and lift cylinders, which allows the load from the lift cylinders and rollers to be spread over a large area. However, this disclosed system in the '525 patent does not allow for movement of heavy load in a direction perpendicular to the long axis of the support beams. That is, movement of the heavy load is restricted in the walking device disclosed in the '525 patent to only particular directions, which can make fine tuning of the position of the heavy load difficult.

The inclusion of a walking system to a mounting structure may involve additional support structures or connections in order to transfer the weight of the mounting structure and/or load to the walking system. The support structures and/or connections may require additional time for assembly and/or disassembly during various operations associated with the mounting structure, such as operations associated with storage and/or transportation of the mounting structure over relatively large distances.

The present invention addresses these and other problems.

SUMMARY

Embodiments of the present invention are directed to a load transporting apparatus that automatically aligns a support foot of the apparatus with a load-bearing, frame connected to the load transporting apparatus during a recovery phase of an incremental walking movement. In particular, the load transporting apparatus includes a linking device attached to a support foot of the apparatus and a biasing device connected to the linking device that is deflected during non-linear load transporting movements, where the biasing device acts to automatically return the support foot to an aligned position relative to the load-bearing frame after a non-linear movement has been completed and the support foot is raised above a ground surface.

A mounting structure for a rig is herein disclosed as comprising a base configured to support the mounting structure on an operating surface and a plurality of transport systems operatively connected to the base and configured to lift the mounting structure off of the operating surface. An elevated rig platform may be connected to the base by a plurality of support struts. At least some of the support struts comprise a mounting connection that is configured to pivot to lower the elevated rig platform toward the base and place the mounting structure in a partially collapsed state. Additionally, a connecting member may be attached to one or more of the plurality of transport systems. In response to the elevated rig platform being lowered to the partially collapsed state, the connecting member may be configured to displace at least a portion of the one or more transport systems while the base remains in contact with the operating surface.

In some examples, a mounting structure for a rig may comprise a base configured to support the mounting structure on an operating surface, and means for lifting the base off of the operating surface. An elevated rig platform may be connected to the base by a plurality of support struts. At least some of the support struts may comprise a mounting connection that pivots to lower the elevated rig platform toward the base and place the mounting structure in a partially collapsed state. Additionally, the mounting structure may comprise means for displacing at least a portion of the means for lifting in response to the elevated rig platform being lowered to the partially collapsed state. The portion of the means for lifting may be displaced while the base remains in contact with the operating surface.

Further disclosed herein is a method for placing a mounting structure in a partially collapsed state. The method may comprise supporting a base of the mounting structure on an operating surface and lifting, with a transport system, the base off of the operating surface to move the mounting structure to a destination. The transport system may be configured to lower the base to contact the operating surface at the destination. In some examples, an elevated platform may be connected to the base by a plurality of support struts. The elevated platform may be lowered while the base is in contact with the operating surface. At least some of the support struts comprise a mounting connection that pivots to lower the elevated rig platform toward the base. Additionally, the method may comprise displacing, with a connecting member, at least a portion of the transport system in response to the elevated rig platform being lowered. The portion of the transport system may be displaced by the connecting member while the base remains in contact with the operating surface.

BRIEF DESCRIPTION OF THE DRAWINGS

FIGS. 12A, 12B, 12C, 12D, and 12E are diagrams of walking apparatuses with various alignment restoration devices according to embodiments of the invention.

DETAILED DESCRIPTION

Walkers, or walking machines, may comprise one or more devices that are used for transporting very heavy loads, such as entire oil well drilling rigs. Such loads may be as heavy as several thousand tons and may be sequentially positioned very precisely over spaced-apart well bores, for example. Load transporting apparatuses or systems may include one or more walking machines, depending on the specific configuration of a walking system.

Embodiments of the present concept are directed to load transporting apparatuses, such as walking machines, for moving heavy loads over small distances with the ability to fine tune the resultant position of the heavy load. For ease of understanding, the terms, "walkers," "walking machines," "walking devices," and "walking apparatuses" are used interchangeably below. Load transporting apparatuses or systems may include one or more walking machines. Additionally, a walking machine's subassembly of components that facilitate movement of the walking machine are referred herein as a "walking mechanism." Walking machines may incorporate one or more walking mechanisms, depending on the specific configuration of a walking machine.

Figure 1A:
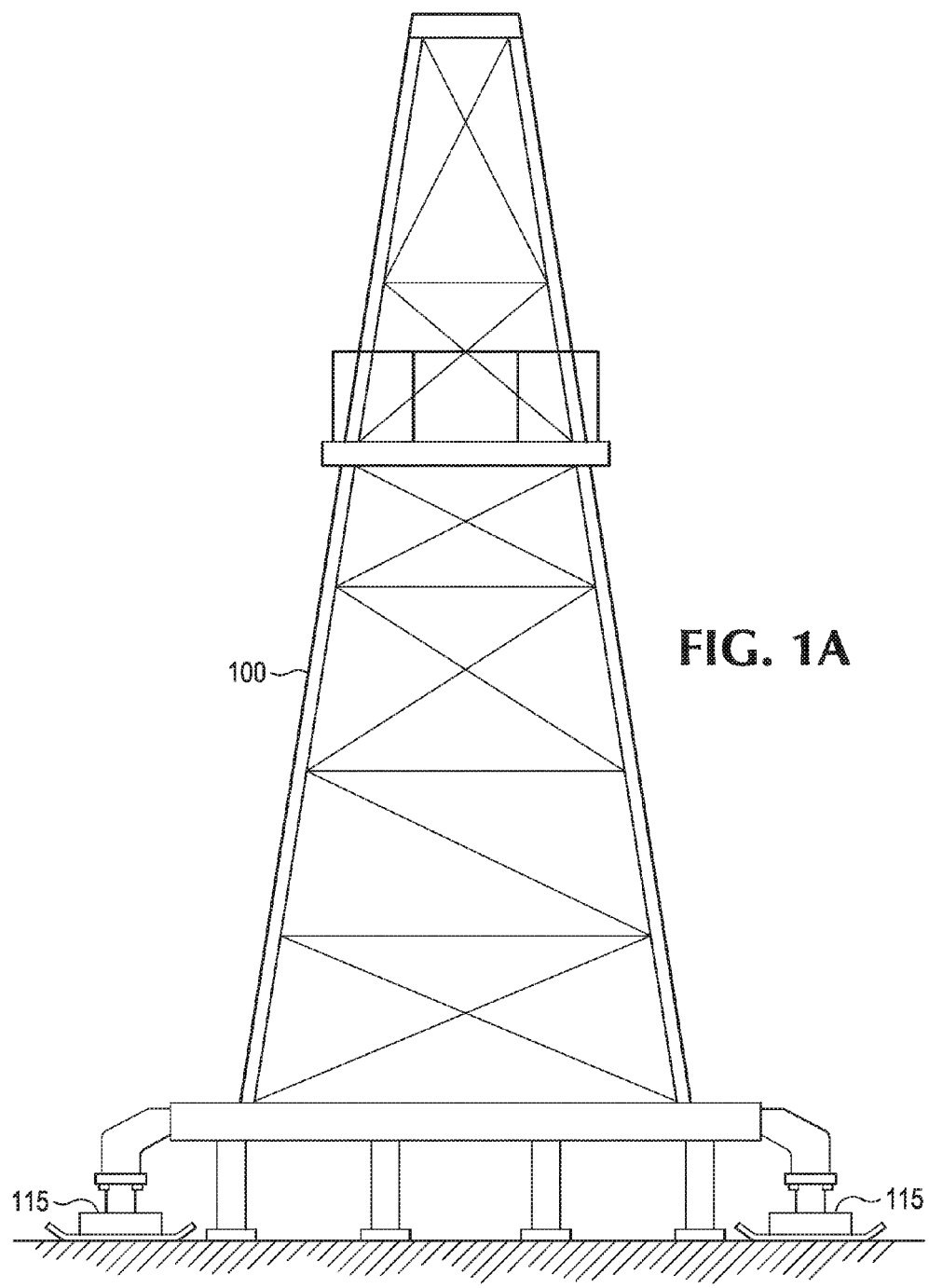
FIGS. 1A and 1B are diagrams of walking apparatuses attached to various loads according to embodiments of the invention.
Figure 1B:
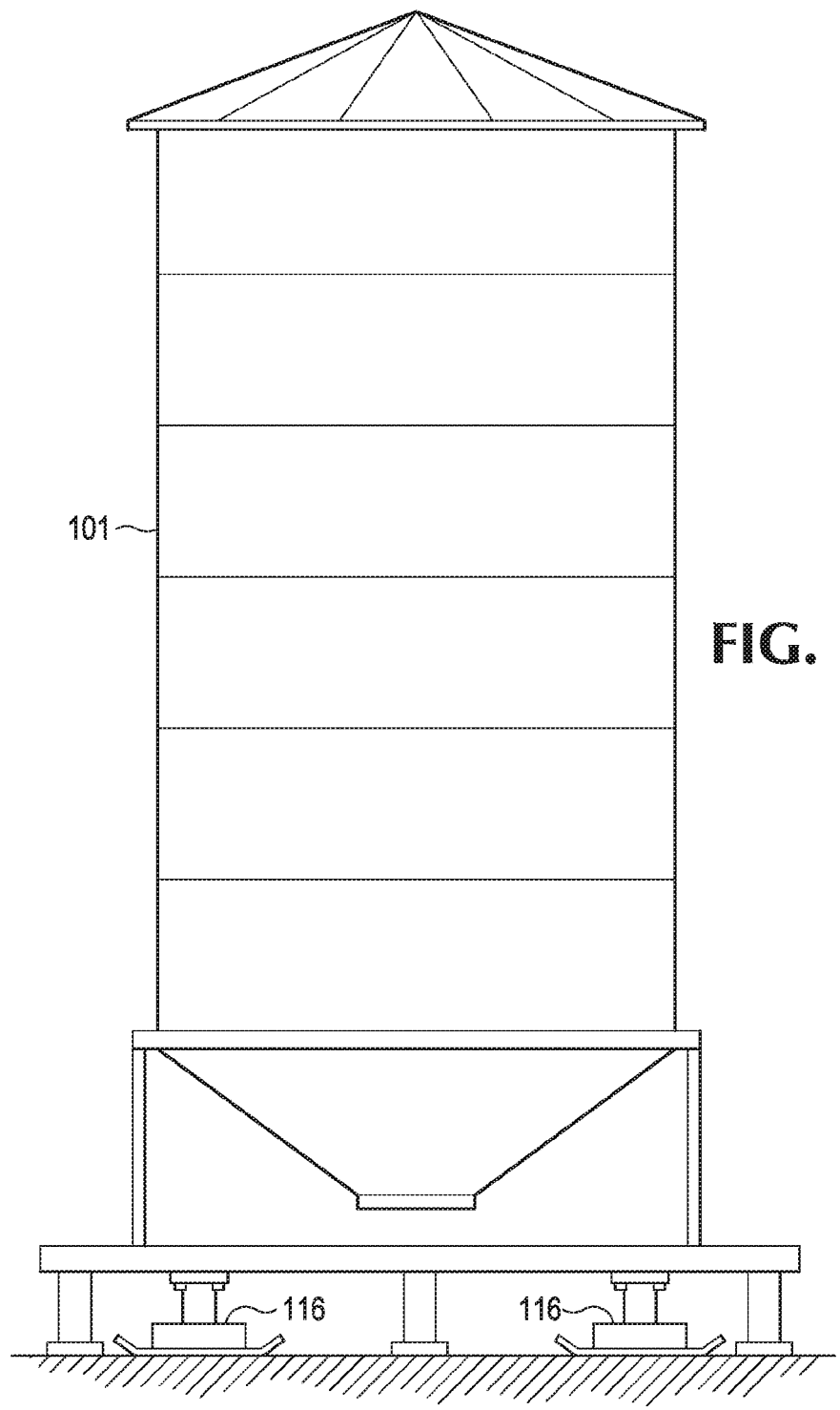

For example, with reference FIGS. 1A and 1B, a load transporting system includes multiple walking machines that support a load being carried by the load transporting system. FIGS. 1A and 1B show examples of walking apparatuses attached to various loads according to embodiments of the invention. Referring to FIG. 1A, multiple walking apparatuses 115 are positioned under or adjacent to an oil rig 100. Typically, walking machines 115 are positioned at least near edge portions of a load 100 to balance the weight of the load over the various walking machines. However, specific situations may dictate that walking machines 115 are positioned in various other locations relative to the load 100.

Referring to FIG. 1B, multiple walking apparatuses 116 are positioned under or adjacent to a silo 101. Although an oil rig load 100 and a silo 101 are respectively illustrated in FIGS. 1A and 1B, walking machines may be used to move any type of relatively large load, such as bridge sections, ship sections, structures, etc. Additionally, although two walking machines are shown in FIGS. 1A and 1B, more or fewer walking machines may be used to move loads 100, 101.

Figure 2A:
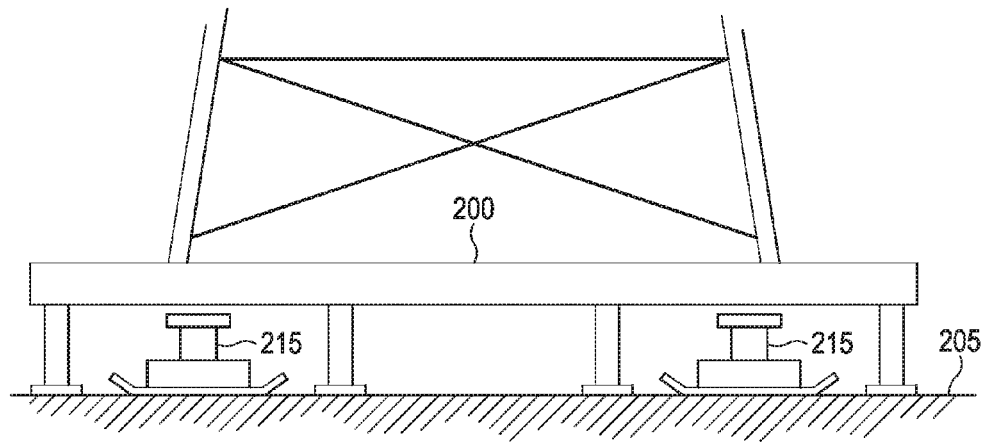
FIGS. 2A, 2B, 2C, 2D, 2E, and 2F are detail diagrams showing an example operational progression of walking apparatuses to move a load according to embodiments of the invention.
Figure 2B:
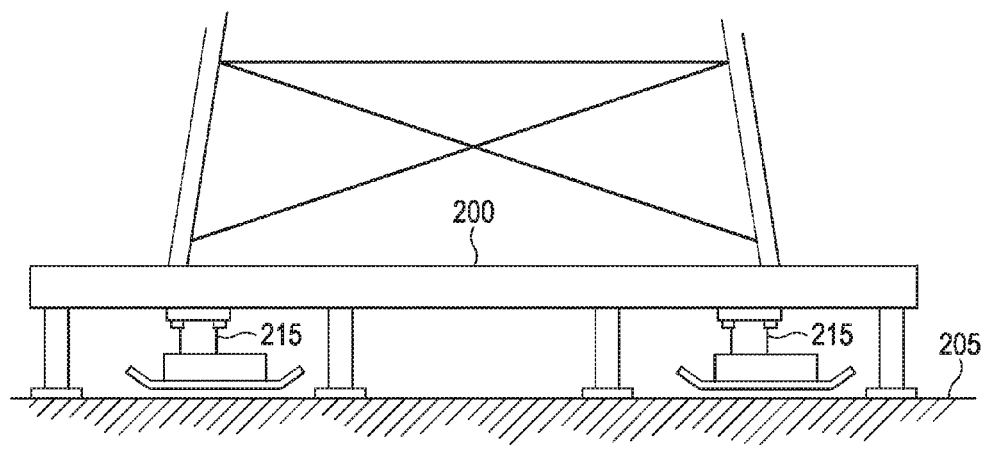
Figure 2C:
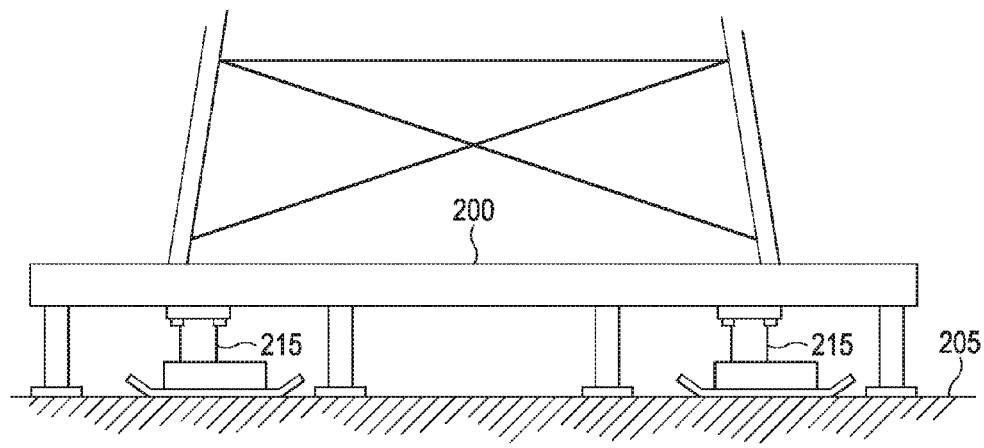

FIGS. 2A-2F provide an overview of an example operation of walking apparatuses to move a load according to embodiments of the invention. Referring to FIG. 2A, walking apparatuses 215 are positioned on a base surface 205 below or adjacent to a load 200. Referring to FIG. 2B, the walking apparatuses 215 are attached to the load 200, and are positioned above a base surface 205. As described below, there are many possible connection variations that can be used to connect the walking apparatuses to a load 200. Referring to FIG. 2C, the walking apparatuses 215 are operated so that a foot portion of the walking apparatus contacts the base surface 205. The walking apparatuses 215 may be operated substantially simultaneously, or may be operated in intervals depending on the conditions of the base surface 205 and the load 200 that is to be moved.

Figure 2D:
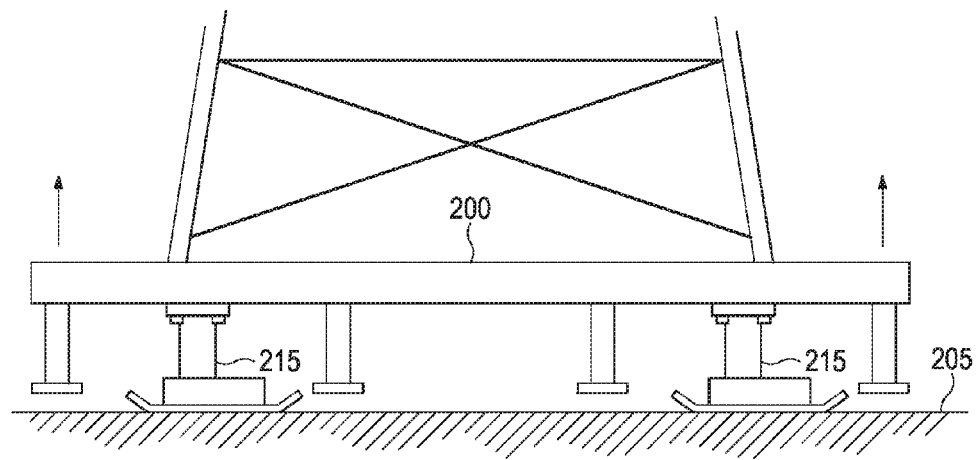

Referring to FIG. 2D, the walking apparatuses 215 are operated to lift the load 200 above the base surface 205. The walking apparatuses 215 may again be operated substantially simultaneously to lift the load 200, or may be operated in intervals depending on the conditions associated with the desired move.

Figure 2E:
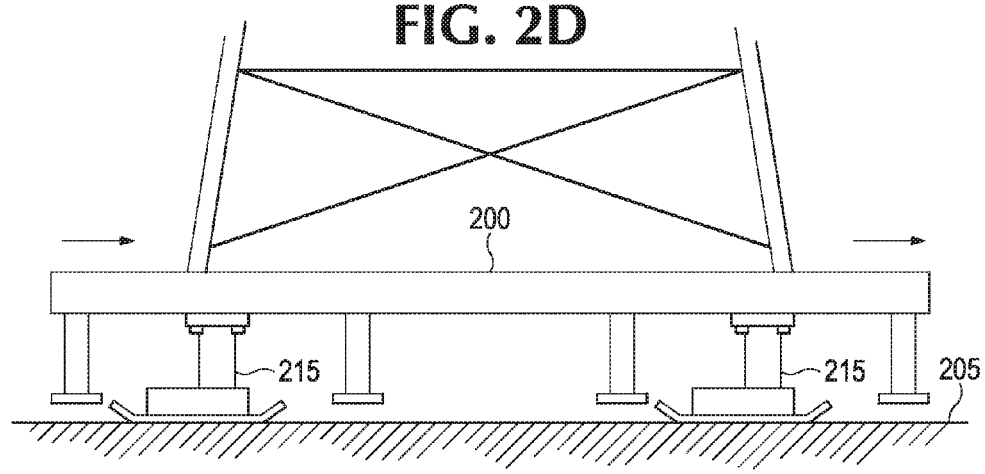
Figure 2F:
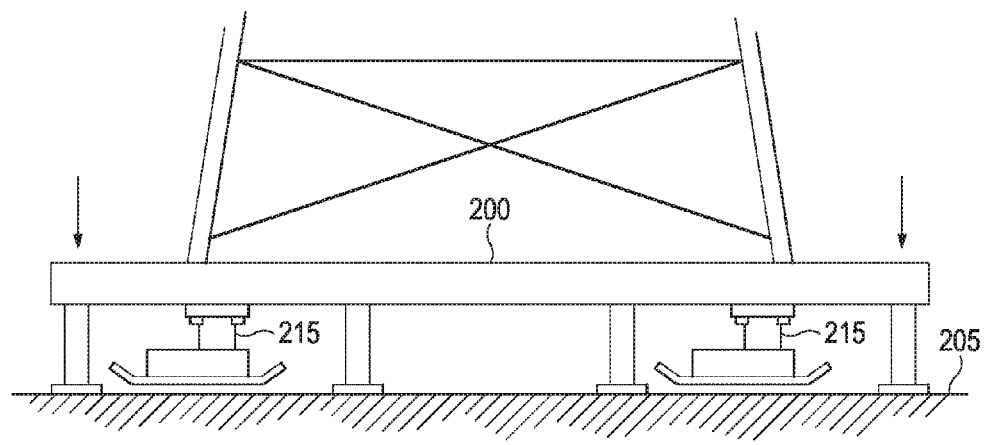

Referring to FIG. 2E, the walking apparatuses 215 are operated to move the load 200 to the right. Although FIG. 2E shows the load 200 being moved to the right, the walking apparatuses can be operated to move the load in a variety of directions depending on the desired final location of the load. Referring to FIG. 2F, the walking apparatuses 215 are operated to lower the load 200 to the base surface 205 and to raise the foot portions of the walking apparatuses above the base surface. That is, after the load 200 is positioned on the base surface 205, the walking apparatuses 215 are further operated so that they are raised above the base surface. Here, the connection between the walking apparatuses 215 and the load 200 support the walking apparatuses 215 when they are raised above the base surface 205. After the walking apparatuses 215 are raised above the base surface 205, they are further operated to be repositioned for another movement walking step, such as by moving the foot portions of the walking apparatuses to the right so that they are in a position as shown in FIG. 2B. That is, the base surface touching part of the walking apparatuses 215 (e.g., the support foot and related structures) is moved to the right while the walking apparatuses 215 are raised above the base surface 205. After the walking apparatuses 215 have been repositioned, they are operated to be lowered to the base surface 205 as shown in FIG. 2C. This completes a single walking cycle, and further walking cycles or steps can be performed by repeating the steps described above with respect to FIGS. 2D to 2F.

Figure 3A:
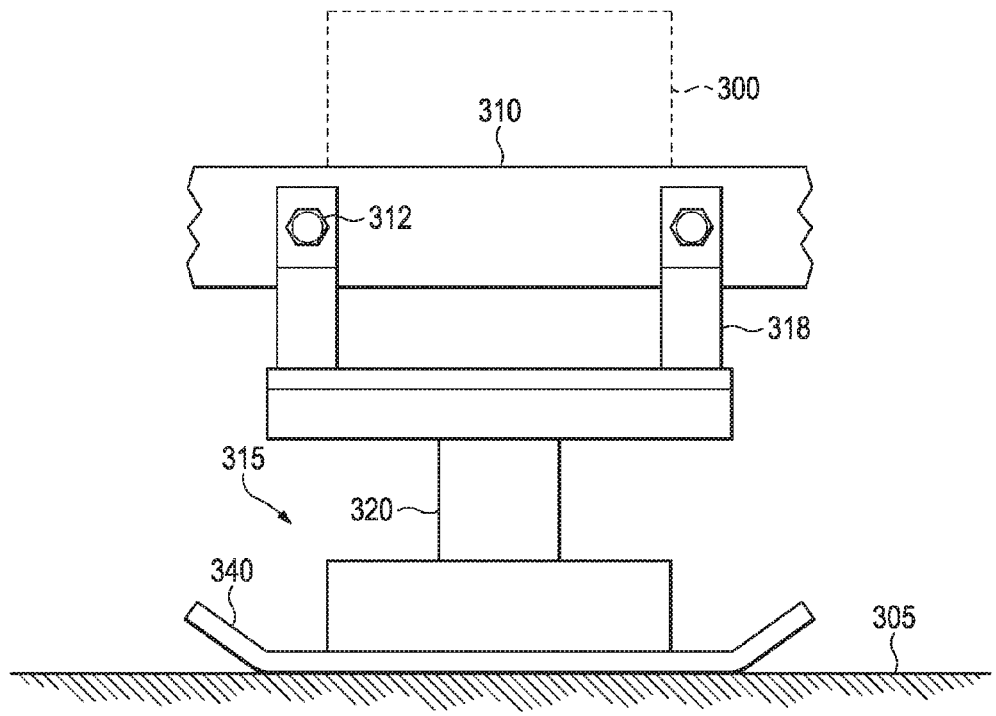
FIGS. 3A and 3B are diagrams illustrating example connection arrangements used to connect a walking apparatus to a load according to embodiments of the invention.
Figure 3B:
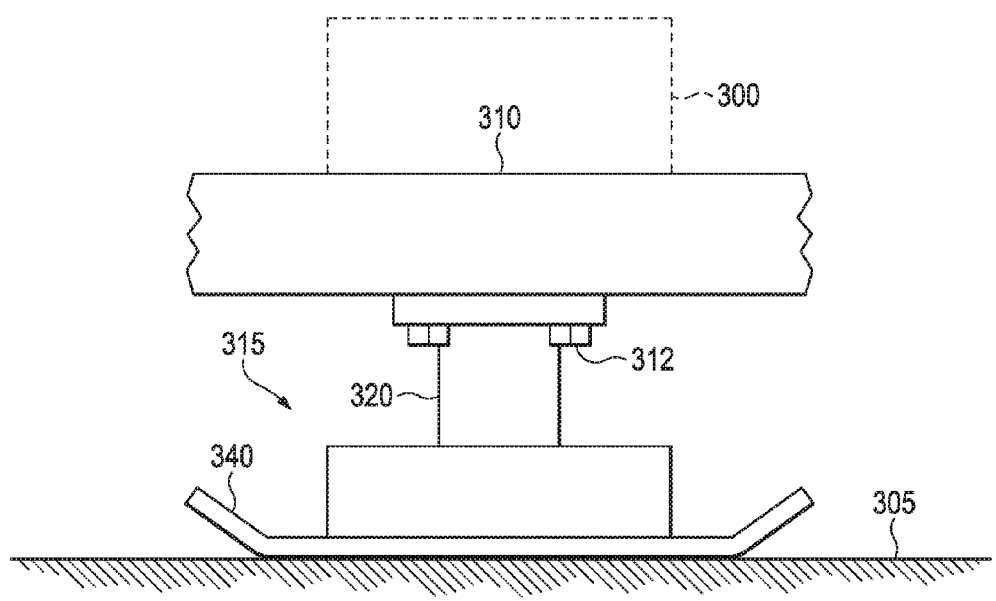

As mentioned above, walking apparatuses can be connected to loads in a variety of ways depending on the specific conditions surrounding the load. FIGS. 3A and 3B illustrate two such connection schemes. Although two connection schemes are illustrated in FIGS. 3A and 3B, embodiments of the invention are not limited to such connection schemes, as many different connection variations exist and are included in the scope of this concept.

Referring to FIG. 3A, a walking apparatus 315 includes a support foot 340 to interface with a base surface 305 and a lift mechanism 320 to raise and lower a load 300. In the embodiment shown in FIG. 3A, the lift mechanism 320 of the walking apparatus 315 is attached to a connection frame 318, which in turn is bolted to framework 310 supporting the load 300 with bolts 312 or other connection mechanisms. In some embodiments, the connection frame 318 may be part of the walking apparatus 315 and in some instances, may be permanently welded, bolted, or otherwise connected to the lift mechanism 320 of the walking apparatus. In other embodiments, the connection frame 318 may be separate from the walking apparatus 315, and may only be temporarily used with the walking apparatus in certain situations. In these embodiments, for example, multiple different connection frames 318 may be built or used with specific load conditions or specifications.

Figure 10:
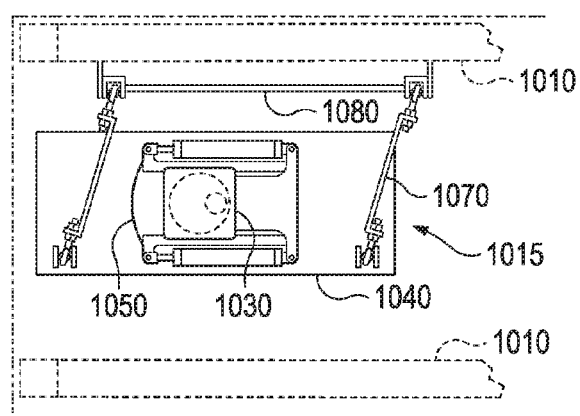
FIG. 10 is a top view of a walking apparatus after a load-movement phase of a walking cycle completed in a parallel direction according to embodiments of the invention.

FIG. 3B shows different embodiments where the portions of a lift mechanism 320 of a walking apparatus 315 are directly connected to a support frame 310 structured to support a load. 300 with bolts 312 or other connection mechanisms. The support frame 310 may be considered part of the load 300 in some instances where it is a permanent part of the load structure. For example, in instances where the load is a silo, such as shown in FIG. 10, the metal frame of the silo may be considered the support frame 310 of the load 300, while also being part of the silo, and hence part of the load. In other cases, the support framework 310 may be an ancillary structure that is only used to stabilize and support the load 300 during movement of the load.

Figure 4:
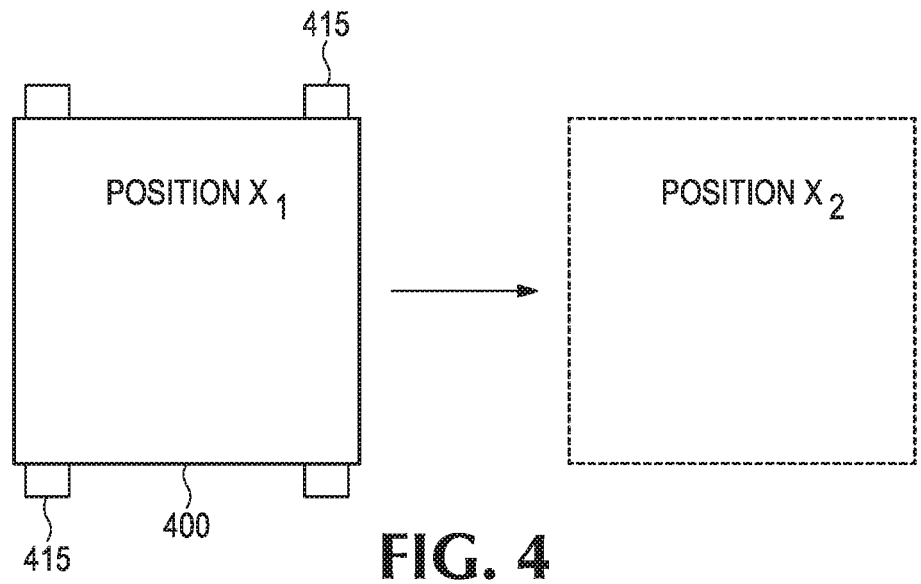
FIG. 4 is a schematic diagram illustrating movement of a load along a substantially linear path according to embodiments of the invention.

FIG. 4 is a schematic diagram illustrating movement of a load along a substantially linear path according to embodiments of the invention. Referring to FIG. 4, load 400 is connected to multiple walking apparatuses 415, which are used to move the load from an initial position X1 to a final position X2 along a substantially linear path. Here, that path is a horizontal path moving from left to right. This type of basis linear movement can be accomplished by a variety of walking systems.

Figure 5:
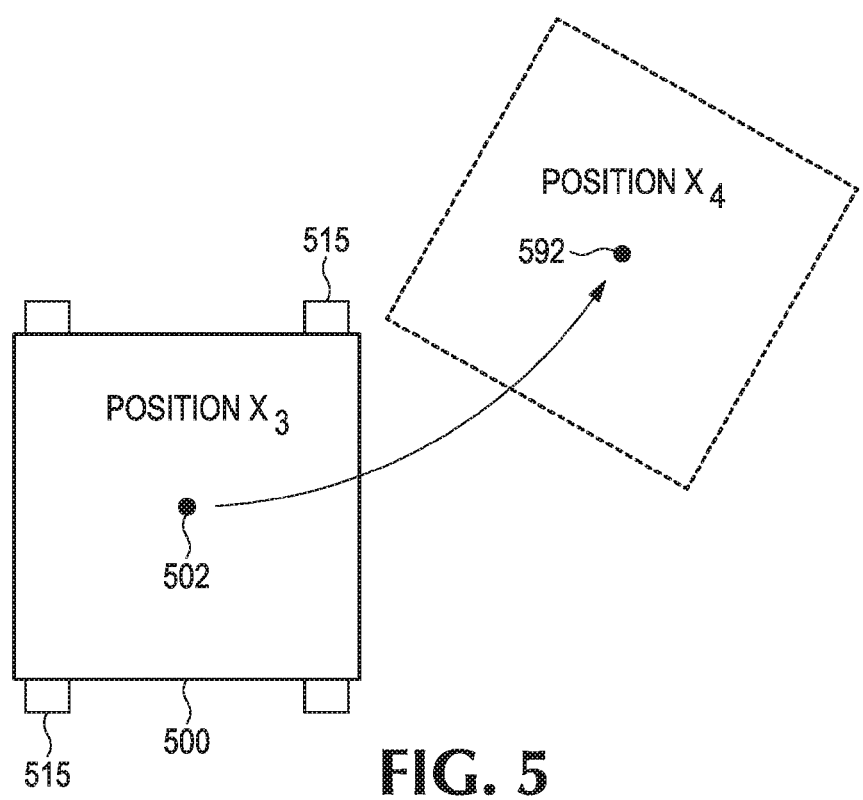
FIG. 5 is a schematic diagram illustrating movement of a load along a curved path according to embodiments of the invention.

FIG. 5 is a schematic diagram illustrating movement of a load along a curved path according to embodiments of the invention. Referring to FIG. 5, a load 500 is connected to multiple walking apparatuses 515, which are used to move the load from an initial position X3 to a final position X4 along a non-linear path. Here, a reference center-point 502 of the load 500 at the initial position X3 is moved to a reference center-point 592 of the load 500 at the final position X4. Unlike the linear movement shown in FIG. 4, this curved path of travel shown in FIG. 5 requires that the walking apparatuses be steered, which can be accomplished using embodiments of the inventive walking apparatuses described below.

Figure 6:
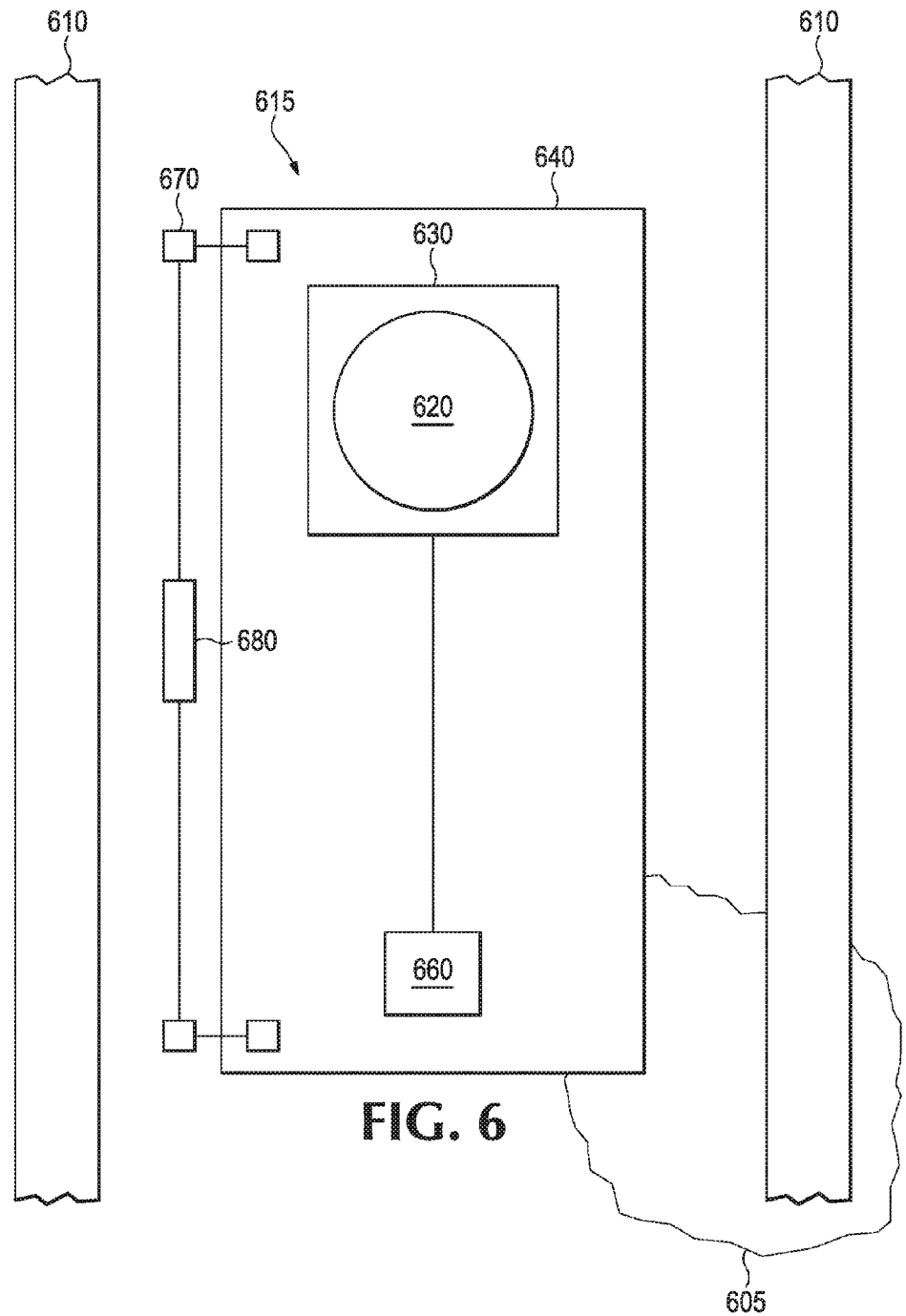
FIG. 6 is a schematic diagram of a top view of a walking apparatus according to embodiments of the invention.

FIG. 6 is a schematic diagram of a top view of a walking apparatus according to embodiments of the invention. Referring to FIG. 6, a load transporting apparatus 615 is configured to move a load (e.g., element 100 FIG. 1) over a base surface 605 in one or more incremental steps each including a load-movement phase and a recovery phase. The load transporting apparatus 615 includes a lift mechanism 620 structured to lift a load-bearing frame 610 supporting the load and a support foot 640 connected to the lift mechanism, the support foot structured to interface with the base surface 605. A roller assembly 630 is also coupled to the lift mechanism 620. A travel mechanism 660 is coupled to the roller assembly 620, and is structured to displace the roller assembly relative to the support foot 640. The load transporting apparatus also includes one or more linking devices 670 coupled to the support foot 640, and one or more biasing devices 680 coupled to the linking devices. The biasing devices 680 are structured to become activated during a load-movement phase when the roller assembly 630 is non-linearly displaced by the travel mechanism 660 relative to the support foot 640, and structured to return the support foot to an aligned position relative to the load-bearing frame 610 during a recovery phase. Here, the support foot 640 may be aligned with the load-bearing frame 610 when a longitudinal centerline of the support foot is parallel with a main beam of the load-beating frame.

In these embodiments, the linking devices 670 are coupled to the biasing device 680 so that when the roller assembly 630 moves the load in a direction different than the orientation of the support foot 640, a deflection force is generated and/or stored as potential energy in the biasing device 680. This deflection force may be stored by deforming the biasing device 680 within the elastic region of a stress-strain curve associated with a material of the biasing device. For example, in embodiments where the biasing device 680 is a torsional bar, the deflection force transmitted to the biasing device during the non-linear displacement or movement may cause the torsional bar to twist.

The contact between the support foot 640 and the base or ground surface 605 creates substantial frictional forces that prevent the support foot from rotating or moving during the non-linear displacement. During the recovery phase of the walking cycle, the support foot 640 is raised above the base surface 605, which eliminates the frictional forces between the foot and the base surface. Once the support foot 640 begins to lose contact with the base surface 605, the potential energy stored in the biasing device 680 is used to return the support foot to an aligned position relative to the load-bearing frame 610. The alignment of the load-bearing frame 610 is dictated by the movement of the roller assembly 630 by the travel mechanism 660. Hence, when the roller assembly 630 is non-linearly displaced (e.g., moved such as shown in FIG. 5), the orientation of the load-bearing frame 610 becomes skewed from the orientation of the support foot 640. In the above example, where the biasing device 680 is a torsional bar, the support foot 640 is returned to a positioned aligned relative to the load-bearing frame 610 when the support foot loses contact with the base surface 605 and the torsion bar is allowed to "untwist," thereby re-orienting the support foot. In other words, the torsion bar is activated when an angular displacement occurs between the support foot 640 and the load-bearing frame 610, where the activation of the torsion bar including a torquing force being applied to the torsion bar.

Although a torsion bar is discussed as the biasing device 680, may different types of biasing devices may be used in other embodiments, such as leaf springs, coil springs, chains, hydraulic cylinders, motors, or any other type of device that can be deflected and/or store potential energy to apply a realignment force to the support foot 640.

Figure 7A:
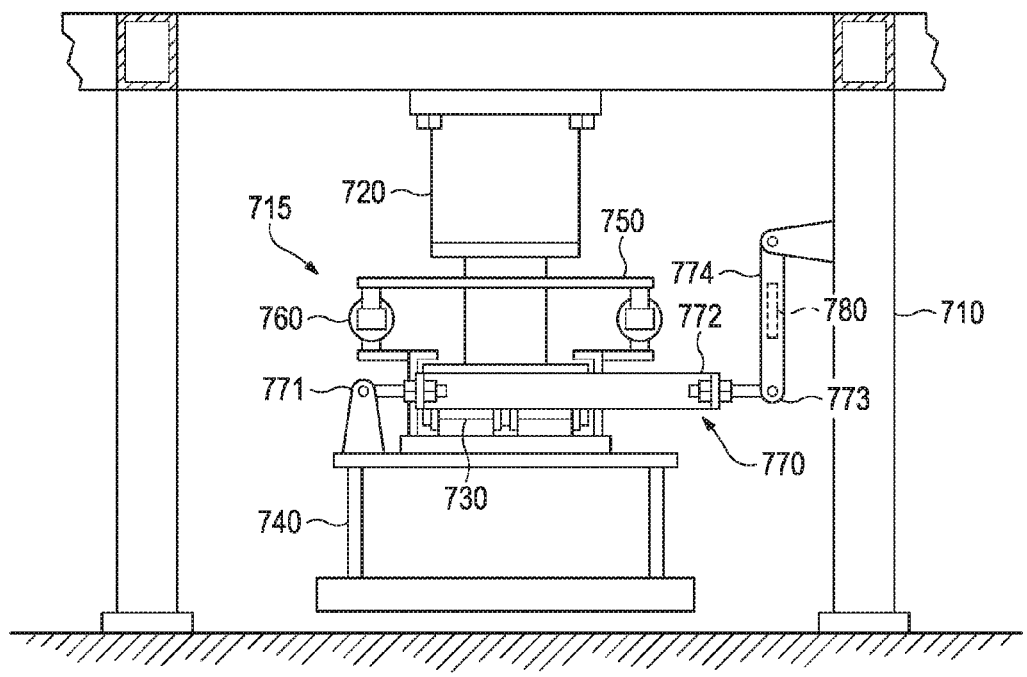
FIG. 7A is a side view of an example walking apparatus in a recovery position according to embodiments of the invention.
Figure 7B:
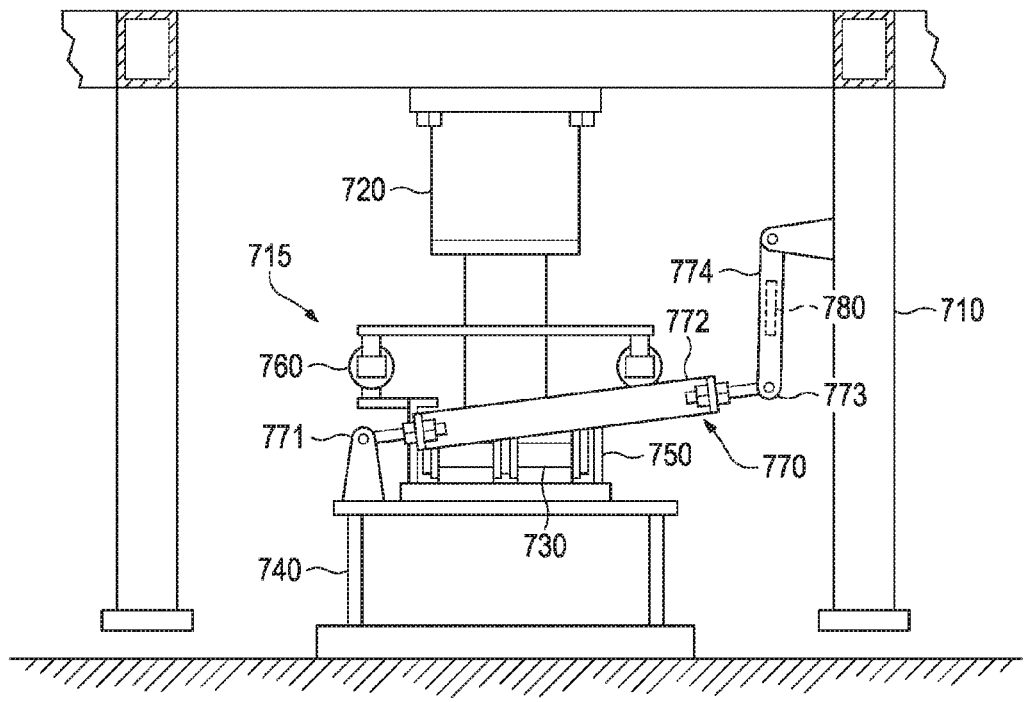
FIG. 7B is a side view of the example walking apparatus shown in FIG. 7A in a load-movement position according to embodiments of the invention.

FIG. 6 is presented in a schematic style view as many possible variations in the appearance and mechanical structure of the load transporting apparatus 615 exist. FIGS. 7A and 7B provide a more detailed view of one embodiment of a load transporting apparatus. FIG. 7A is a side view of an example walking apparatus in a recovery position according to embodiments of the invention. FIG. 7B is a side view of the example walking apparatus shown in FIG. 7A in a load-movement position according to embodiments of the invention. Referring to FIGS. 7A and 7B, a load transporting or walking apparatus 715 includes a lift mechanism 720, a roller assembly 730, a roller track 750, and a support foot 740. The lift mechanism 720 may include a hydraulic jack suspended from a horizontal beam of the load-bearing frame 710. Additional details regarding the structure of the load transporting apparatus 715 can be found in co-pending application Ser. No. 13/711,193, entitled ROTATION DEVICE FOR LOAD TRANSPORTING APPARATUS, the contents of which are herein incorporated by reference in their entirety.

The roller track 750 of the walking apparatus 715 may be coupled to the support foot 740 with a connection mechanism that allows the support foot to rotate relative to the roller track. Various connection mechanisms may be used to facilitate this relative rotation, such as a rotation pin described below in FIG. 9 and in the above mentioned application Ser. No. 13/711,193. In addition, the lift mechanism 720 may be structured to allow the roller assembly 730 to rotate about a substantially vertical axis in the center of a cylinder rod of the lift mechanism. That is, the roller assembly 730 may also be free to rotate around the cylinder rod of the lift mechanism 720.

The walking apparatus 715 may also include a travel mechanism 760 that is connected to the roller track 750 and coupled to the roller assembly 730 such that when the travel mechanism is activated, the roller assembly moves relative to the roller track. In the embodiment shown in FIGS. 7A and 7B, the travel mechanism 760 includes two travel cylinders mounted on the roller track 750 on opposite sides of the roller track. Here, the travel cylinders of the travel mechanism 760 may balance the load being moved by the roller assembly 730 over the roller track 750. In other embodiments, one travel cylinder, or three or more travel cylinders may be used to move the roller assembly 730 relative to the roller track 750. In other embodiments, the travel mechanism 760 may include different movement structures, such as pulleys, levers, winches, tracks, etc.

In the embodiments shown in FIGS. 7A and 7B, the roller assembly 730 may include a plurality of rollers or roller chain that rotate as well as roll on the roller track 750. That is, in some embodiments, the roller assembly 730 may include a WBOT series roller assembly from Hilman Rollers. Due to the configuration of the roller chain 730 of the roller assembly 730 and the tolerance between the roller assembly and the roller track 750 of the walking machine 715, the rollers of the roller chain will typically be engaged with the roller track during operation and use of the walking machine.

The roller assembly 730 may be secured to the lower end of the lift mechanism 720, with the roller assembly being captured within a U-shaped roller track 750. The roller assembly 730 may be configured to roll along the bottom inside surface of the roller track 750 as well as along the underside of the two upper flanges of the roller track. The one or more travel cylinders 760 may be coupled between the lift mechanism 720 and the roller track 750. Accordingly, as will be understood from the more detailed discussion below, these travel cylinders 760 permit for the translation of the roller track 750 relative to the lift mechanism 720 and vice versa. As discussed above, the roller track 750 may be secured to the elongate ground-engaging foot 740 (support foot) via a rotational pin (not shown in FIG. 7, but similar to element 955 of FIG. 9), which enables the roller track to be rotationally positioned relative to the foot for steering of the walking machine 715.

Figure 8A:
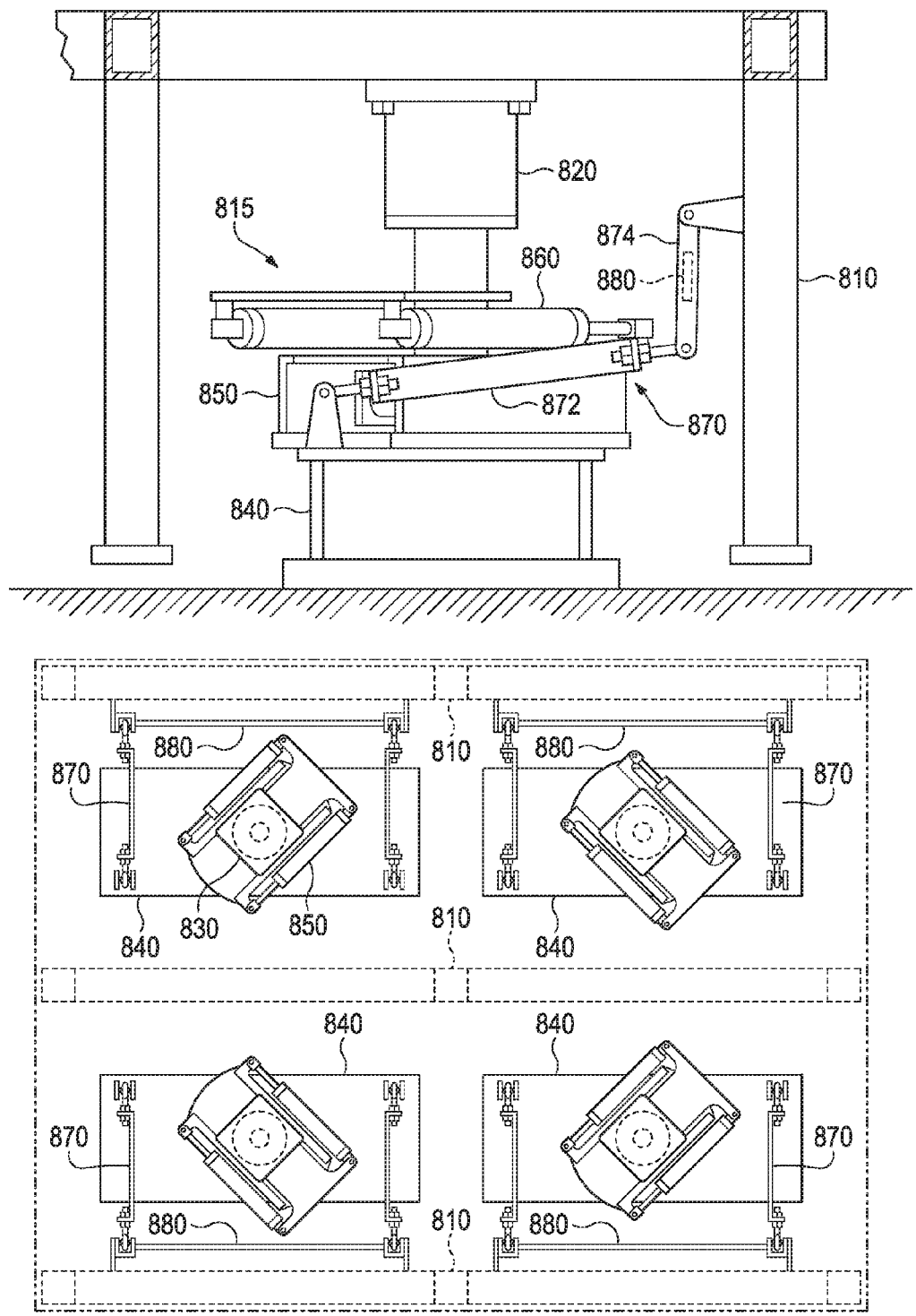
FIGS. 8A, 8B, 8C, and 8D are side and top views of walking apparatuses that illustrate an example operation progression of a load transporting system according to embodiments of the invention.

As shown in FIGS. 7A and 7B, a linking mechanism 770 is coupled to the support foot 740 and a biasing device 780 (shown more clearly as element 880 in FIG. 8A). In some embodiments, the linking mechanism 770 may include a first linking device attached at a first end of the support foot 740, where a second linking device connected to a second end of the support foot opposite of the first end of the first support foot (such as shown in FIGS. 6 and 8A). The biasing device 780 may be coupled between the first and second linking devices of the linking mechanism 770.

In the embodiments shown in FIGS. 7A and 7B, the linking mechanism 770 includes a first linking rod 772 connected to the support foot 740 with a first pivot joint 771. In some embodiments, the first pivot joint 771 may be a spherical rod end bearing configured to allow movement in three degrees of freedom. In other embodiments, the first pivot joint 771 may be another type of joint, such as a hinge joint, that restricts movement to one or two degrees of freedom.

The linking mechanism 770 may also include a second linking rod 774 connected to the first linking rod 772 with a second pivot joint 773. As with the first pivot joint 771, the second pivot joint 773 may be a spherical rod end bearing, or any other type of joint. The second linking rod 774 may further be connected to the load-bearing frame 710. In other embodiments, the one or more biasing devices 780 are also coupled to the load-bearing frame 710.

As shown in FIGS. 7A and 7B, the first and second pivot joints 771, 773 allow linking mechanism 770 to move vertically with the support foot 740 without deflecting or otherwise activating the biasing device 780.

As shown in co-pending application Ser. No. 13/711,315, entitled CENTERING DEVICE FOR LOAD TRANSPORTING APPARATUS, the contents of which is herein incorporated by reference in its entirety, a walking apparatus 715 may also include one or more guide devices positioned adjacent to the roller assembly 730, and one or more biasing devices coupled to the guide devices. Here, the biasing devices may be structured to become deflected during a load-movement phase when the movement of the roller assembly 730 deviates from a set direction of travel, and structured to return the support foot to a centered position relative to the support foot 740 during a recovery phase.

FIGS. 8A, 8B, 8C, and 8D are side and top views of walking apparatuses that illustrate an example operation progression of a load transporting system according to embodiments of the invention. Here, FIGS. 8A-8C may show a load-movement phase of a walking cycle, while FIG. 8D may show a recovery phase of a walking cycle, where the walking apparatus is in a spin steering mode.

Referring to FIG. 8A, a walking apparatus includes a support foot 840 positioned on abase surface 805 and connected to roller track 850. The roller track 850 is structured to allow a roller assembly 830 to move relative to the roller track when activated by a travel mechanism 860. A lift mechanism 820, such as hydraulic jack, is connected between the roller assembly 830 and load-bearing frame 810. A linking device 870 includes a first linking member 872 that is connected to the support foot, and a second linking member 874 that connects the first linking member to the load-bearing frame 810. A biasing device 880 is also connected to the linking device 870, and structured to become deflected or activated during a non-linear movement of the roller assembly 830 relative to the support foot 840. As shown in FIG. 8A, the walking apparatus 815 is in an initial position of a walking cycle in a spin steering mode. The roller tracks 850 of each walking apparatus 815 are oriented in a desired direction of travel. Here, in this first step of making a spin movement, the lift mechanisms 820 are activated to lift the load-bearing frame 810 (and load) above the base surface.

Figure 8B:
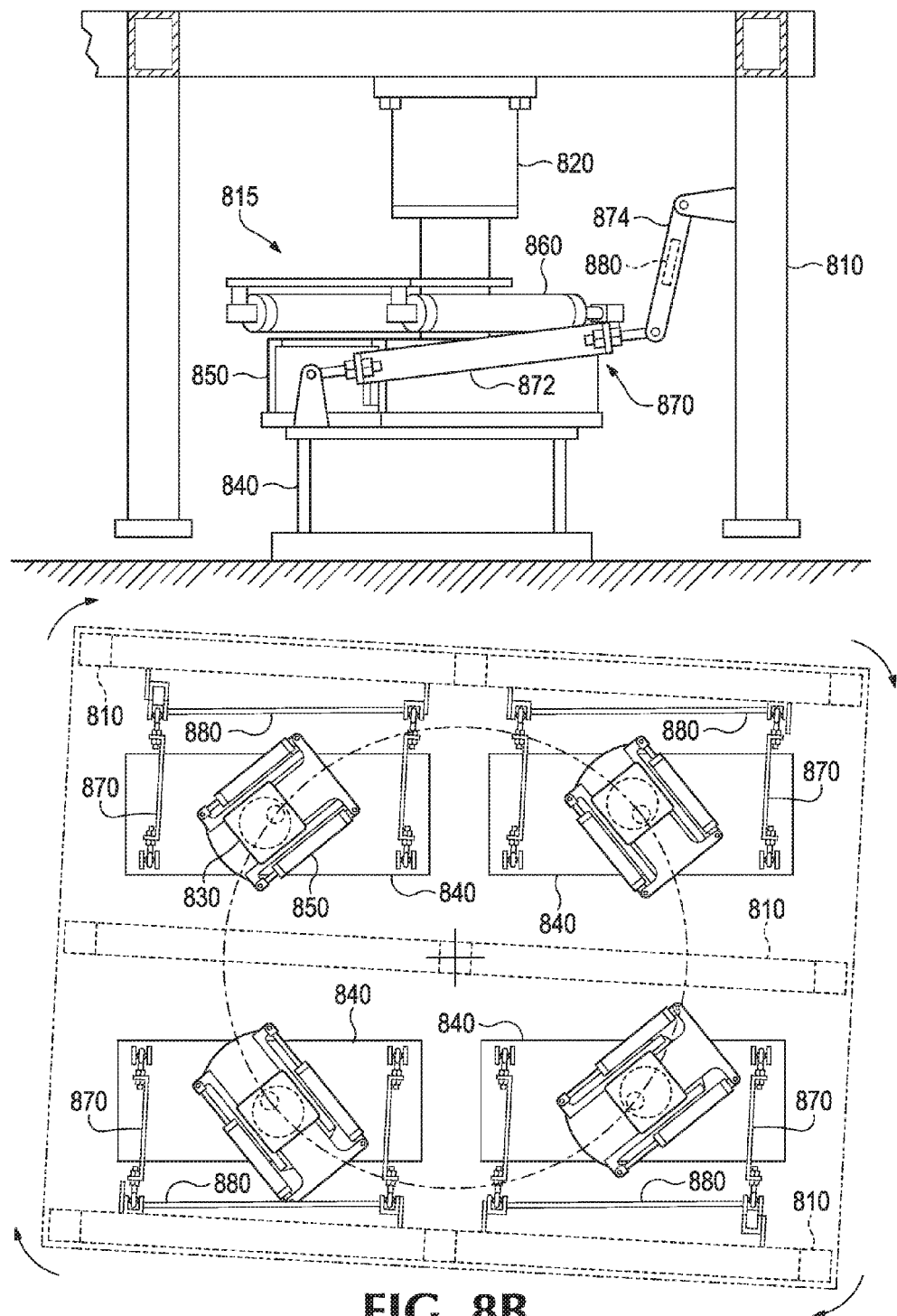

Referring to FIG. 8B, a step in a walking motion of the walking machine is illustrated. Specifically, as indicated by the arrows showing rotation of the load-bearing frame 810, the travel mechanism 860 is activated to displace the roller assembly 830 relative to the roller track 850 as shown. In this second step the walking system is moved in a circular or spin direction. Here, the travel cylinders of the travel mechanism 860 are actuated and the load-bearing frame 810 moves to a new angle. The support feet 840 are on the support surface and an angle of displacement occurs between the load-bearing frame 810 and the support feet. This non-linear movement or angular displacement causes an angular change in the biasing device 880. In embodiments where the biasing device 880 is a torsion bar, the resulting torque on the torsion bar causes the part of the linking device 870 to be in compression and causes another part of the linking device to be in tension.

Figure 8C:
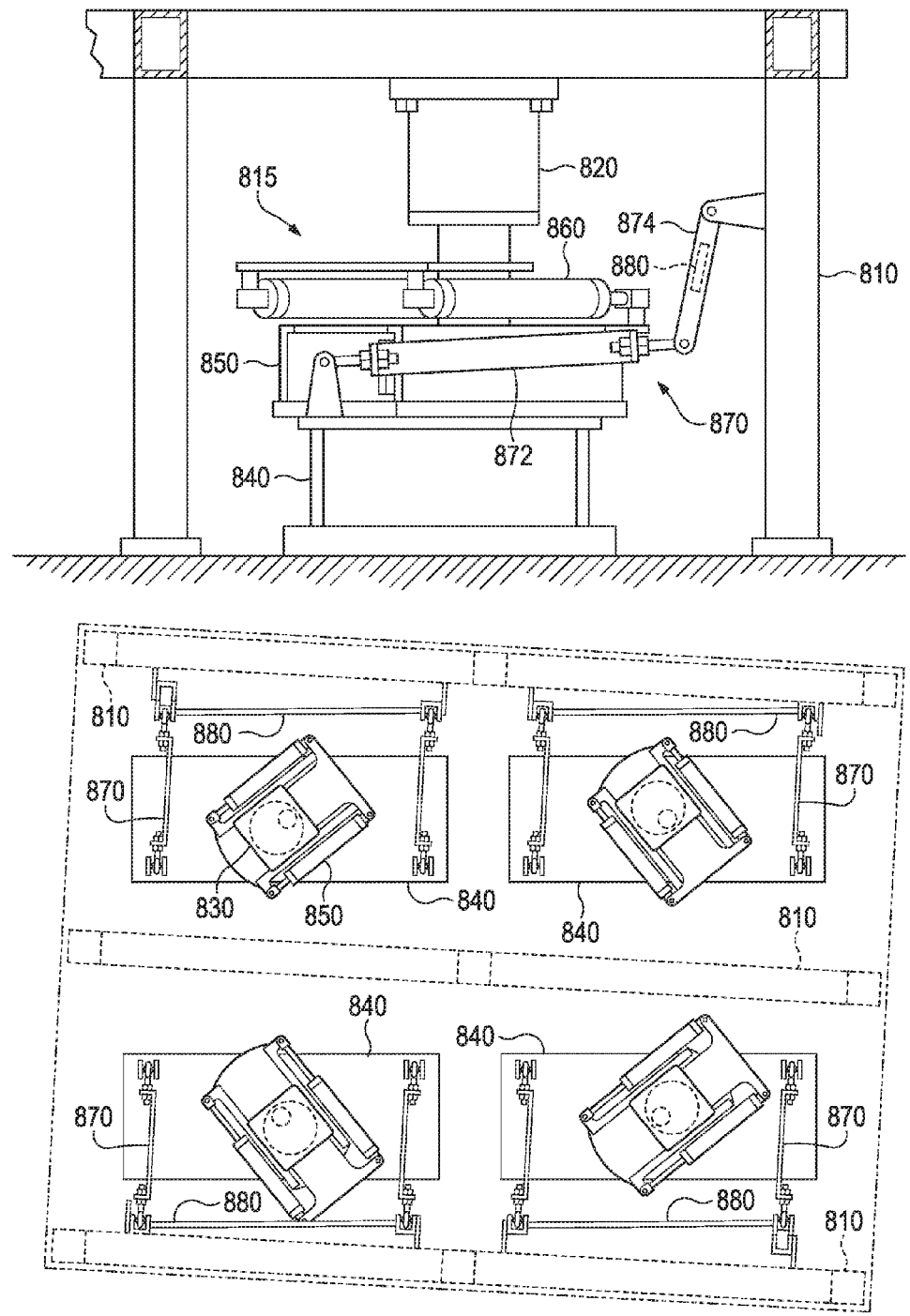

Referring to FIG. 8C, the travel mechanism 860 has finished moving the roller assembly 830 and load-bearing frame 810. Additionally, the lift mechanism 820 has been activated to lower the load and load-bearing frame 810. Here, the load-bearing frame 810 has just contacted the ground surface. However, the support foot 840 is still positioned on the ground surface as well. Hence, the biasing devices 880 are still in a deflected, activated, or biased state.

Figure 8D:
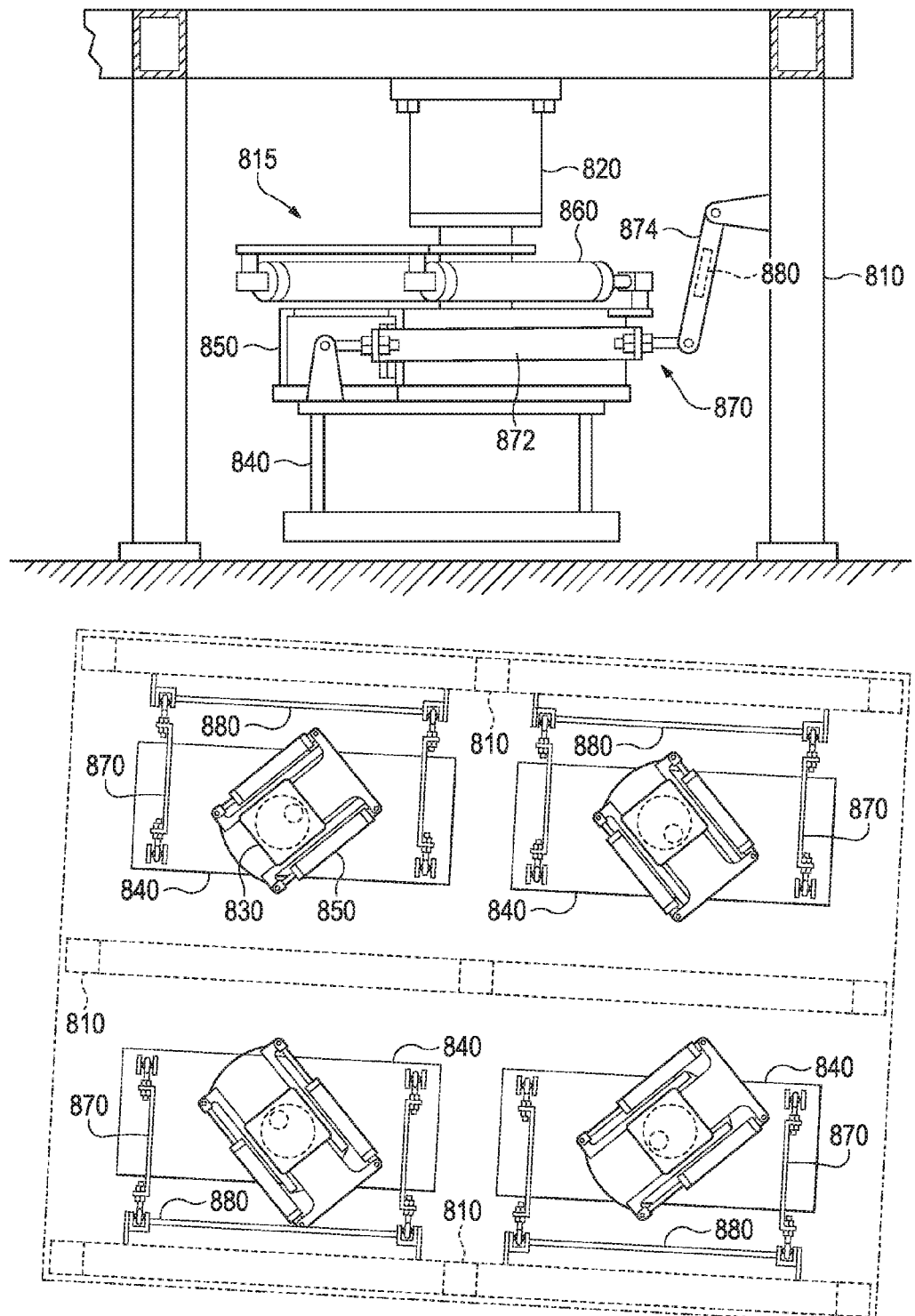

Referring to FIG. 8D, the lift mechanism 820 is continued to be operated such that the support foot 840 loses contact with the ground surface. As soon as this connection between the support foot 840 and the ground surface disappears, the biasing device 880 causes the support foot to "snap" back into alignment with the load-bearing frame 810 as shown.

Figure 9A:
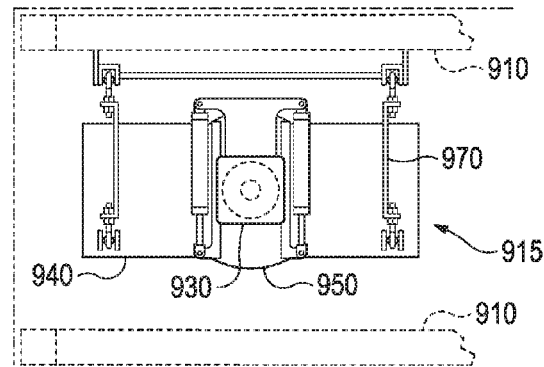
FIG. 9A is a top view of a walking apparatus in a perpendicular orientation according to embodiments of the invention.
Figure 9B:
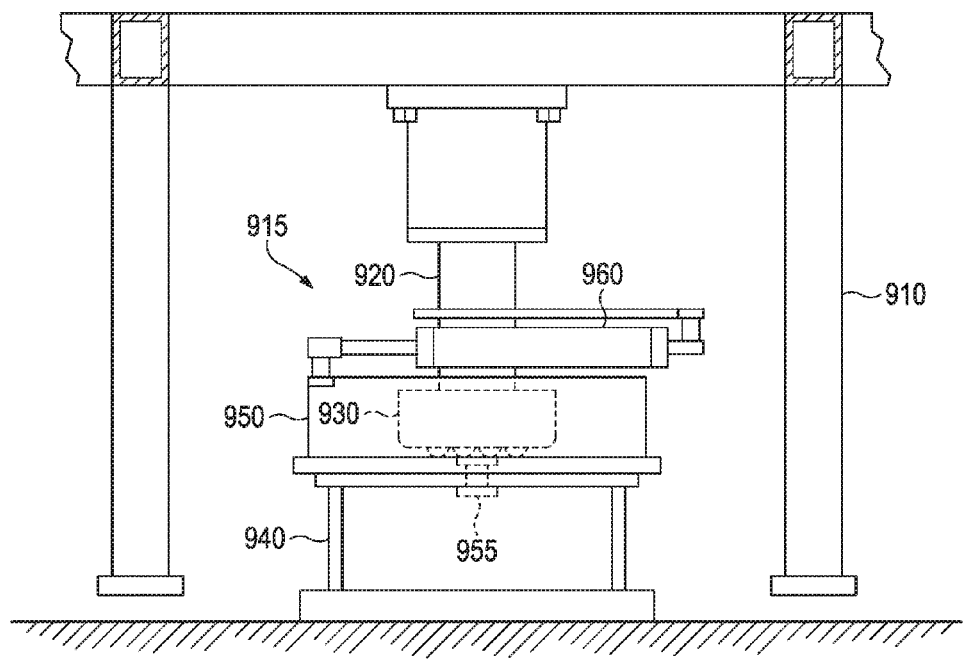
FIG. 9B is a side view of the walking apparatus shown in FIG. 9A in a load-movement position according to embodiments of the invention.
Figure 9C:
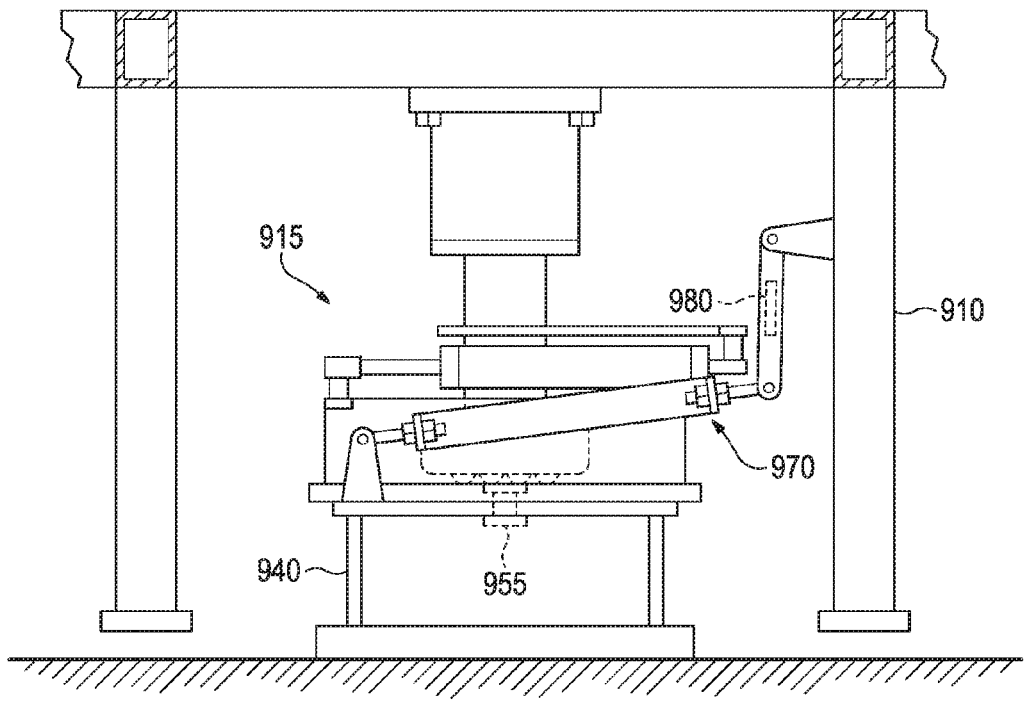
FIG. 9C is a side view of the walking apparatus shown in FIG. 9A in a recovery position according to embodiments of the invention.

FIGS. 9A-9C illustrate another embodiment of a walking apparatus. Here, FIG. 9A is a top view of a walking apparatus in a perpendicular orientation according to embodiments of the invention, FIG. 9B is a side view of the walking apparatus shown in FIG. 9A in a load-movement position where the linking devices have been removed for clarity sake. FIG. 9C is a side view of the walking apparatus shown in FIG. 9A in a recovery position with the linking devices added back in for reference purposes.

Referring to FIGS. 9A-9C, a walking apparatus 915 includes a lift mechanism 920 coupled to a load-bearing frame 910 that supports a load to be moved. The lift mechanism 920 is connected to a roller assembly 930 that is positioned on a roller track 950. The roller assembly 930 is moved relative to the roller track 950 with one or more travel mechanisms 960. The roller track 950 is coupled to a support foot 940 with a rotation pin 955, such a king pin or other connection means that allows rotation of the roller track relative to the support foot as described in the rotation device application (Ser. No. 13/711,193) cited above. A linking device 970 is coupled between the support foot 940 and the load-bearing frame 910. A biasing device 980 is connected to the linking device 970, As described above, the biasing device 980 becomes deflected or activated when the roller assembly 930 moves in a non-linear direction relative to the support foot 940. For example, the roller track 950 is oriented perpendicular to the orientation of the support foot 940 in FIG. 9A. As the roller assembly 930 moves in the direction of the orientation of the roller track 950, the roller assembly and the load-bearing frame will also move substantially perpendicularly to the orientation of the support foot 940.

Here, the movement of the roller assembly 930 in this orientation does not activate or deflect the biasing device 980 because the linking devices 970 include joints that allow for the free movement of the roller assembly. The linking devices 970 may be structured in this manner because the orientation of the support foot 940 relative to the load-bearing frame 910 does not change.

This can also be seen when the roller assembly is moved parallel to the orientation direction of the support foot, as shown in FIG. 10. Referring to FIG. 10, a walking apparatus 1015 has just completed a load-movement phase of a walking cycle where a roller track 1050 is oriented in the same direction as a support foot 1040. Here, the roller assembly 1030 was moved to the right, along with the load-bearing frame 1010, as shown. The joints of the linking device 1070, however, allow the linking device to be angled from the linear movement without deflecting or otherwise activating the biasing device 1080. During a recovery phase, the load-bearing frame 1010 is lowered and the support foot 1040 is raised above a base surface. The support foot 1040 can then be repositioned relative to the roller assembly 1030 by activation of the transport mechanism 960 (FIG. 9B).

Some of the embodiments discussed above rely on the load-bearing frame as a reference point to realign the support feet during non-linear movements of the load. However, in other embodiments, other linking and biasing devices can be utilized to maintain alignment of the support feet. Some of these techniques are discussed below with respect to FIGS. 11 and 12A-12E.

Figure 11:
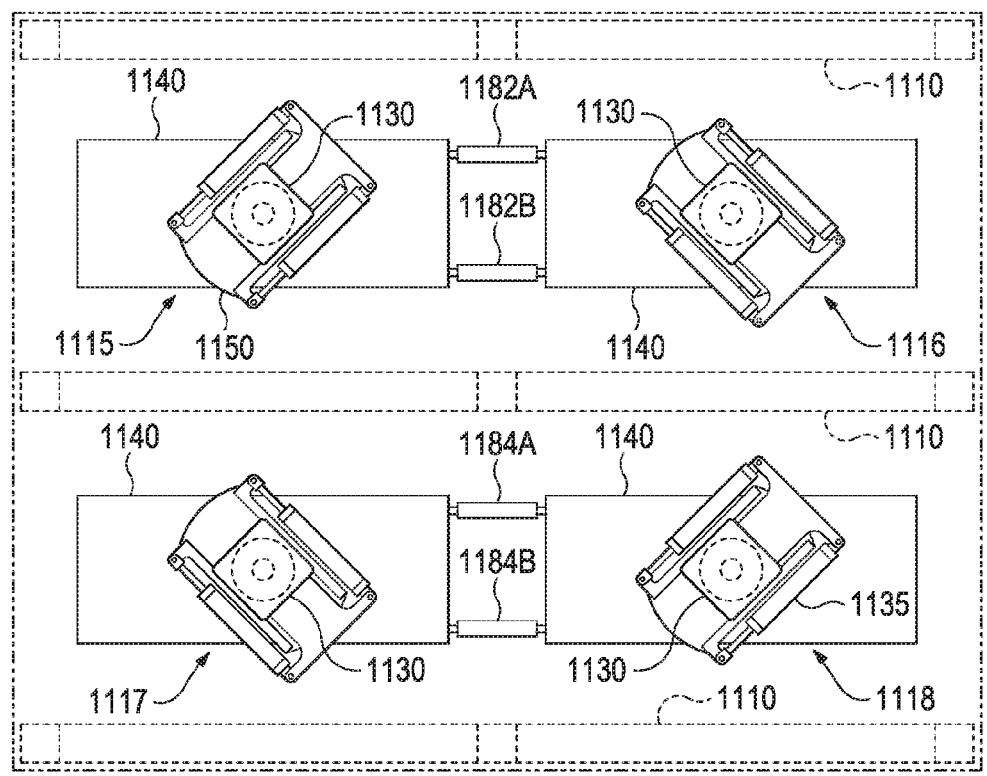
FIG. 11 is a top view of a load movement system according to embodiments of the invention.

FIG. 11 is a top view of a load movement system according to embodiments of the invention. Referring to FIG. 11, multiple load transporting apparatuses 1115,1116, 1117, 1118 are used to move a load supported by a load-bearing frame 1110. Each of these load transporting apparatuses 1115,1116, 1117, 1118 include a roller track 1150, a roller assembly 1130 that moves relative to the roller track, and a support foot 1140. Here, load transporting apparatuses that are in orientation-rows are connected with one or more biasing devices 1182, 1184. In particular, the support foot 1140 of a first load transporting apparatus 1115 is connected to the support foot of a second load transporting apparatus 1116 with two biasing devices 1182A and 1182B. These biasing devices 1182A, 1182B ensure that the first and second load transporting apparatuses 1115, 1116 are maintained in alignment with one another and the load-bearing frame 1110.

Here, the linking devices include a first linking device 1182A coupled between a first side of a first end of the first support foot 1140 and a first side of a first end of the second support foot 1140, and a second linking device 1182B coupled between a second side of the first end of the first support foot and a second side of the first end of the second support foot. The placement of the first and second linking devices 1182A, 1182B may ensure that the support feet 1140 are aligned together during a non-linear movement.

Similarly, the support foot 1140 of a third load transporting apparatus 1117 is connected to the support foot of a fourth load transporting apparatus 1118 with two biasing devices 1184A and 1184B. These biasing devices 1184A, 1184B ensure that the third and fourth load transporting apparatuses 1117, 1118 are maintained in alignment with one another and the load-bearing frame 1110.

Although FIG. 11 illustrates one example embodiment of biasing device connections that can maintain alignment of a support foot relative to a load-bearing frame, many different configuration variations exist. FIGS. 12A, 12B, 1C, 12D, and 12E are diagrams of walking apparatuses with various alignment restoration devices that illustrate some of these variations according to embodiments of the invention.

Referring to FIG. 12A, a linking device 1271 is connected between a first support foot 1240 of a first load transporting apparatus 1215 and a second support foot 1241 of a second load transporting apparatus 1216. The linking device 1271 may be attached to the first support foot 1240 with a first joint 1291, and may be attached to the second support foot 1241 with a second joint 1292. In some embodiments, the first and second joints 1291, 1292 may be ball joints that allow rotational movement. The linking device 1271 may be rigid rod, or may include a section of chain.

Referring to FIG. 12B, a linking device 1272 is connected between a first support foot 1240 of a first load transporting apparatus 1215 and a second support foot 1241 of a second load transporting apparatus 1216. The linking device 1272 may be rigidly attached to the first support foot 1240, but may be attached to the second support foot 1241 with a first biasing device 1281 and a second biasing device 1282. The first and second biasing devices 1281, 1282 may be placed on opposite sides of the linking device 1272 to provide a balanced system to return the support feet 1240, 1241 to uniform alignment after a non-linear movement.

Referring to FIG. 12C, a first biasing device 1283 and a second biasing device 1284 are connected between a first support foot 1240 of a first load transporting apparatus 1215 and a second support foot 1241 of a second load transporting apparatus 1216. This embodiment may be similar to the shown in FIG. 11, except that the first and second biasing devices 1283, 1284 are specified as spring devices.

Referring to FIG. 12D, the support foot 1240 of a load transporting apparatus 1215 is connected to a load-bearing frame 1210 via a first linking cylinder 1273 and a second linking cylinder 1274. The first and second linking cylinders 1273, 1274 may be hydraulic cylinders that are activated during a recovery phase of a walking cycle to return the support foot 1240 to alignment with the load-bearing frame 1210. Alternatively, the first and second linking cylinders 1273, 1274 may be spring cylinders that automatically return the support foot 1240 to alignment with the load-bearing frame 1210 during a recovery phase of a walking cycle without additional operator input.

Referring to FIG. 12E, a support foot 1240 of a load transporting apparatus 1215 is connected at each corner to a biasing device 1285, 1286, 1287, 1288. These biasing devices 1285, 1286, 1287, 1288 may ensure that the support foot 1240 is maintained in alignment with a load-bearing frame during the recovery phase of a walking cycle by releasing potential energy stored during compression and/or elongation during non-linear movements.

Figure 13:
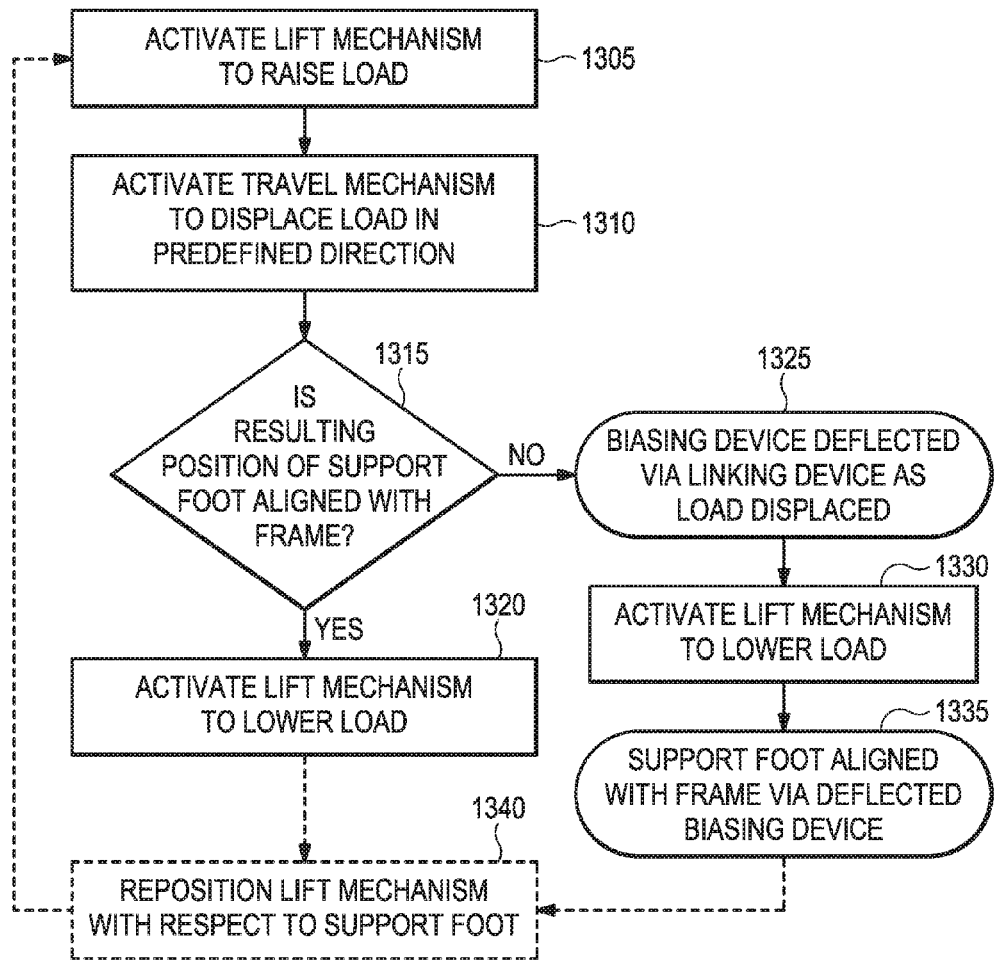
FIG. 13 is a flow diagram illustrating method of operating a load transporting apparatus according to embodiments of the invention.

FIG. 13 is a flow diagram illustrating method of operating a load transporting apparatus according to embodiments of the invention. In particular, the flow diagram of FIG. 13 illustrates a method of aligning a support foot of a load transporting device relative to a load-bearing frame during a load-transporting movement. The load transporting device includes a roller assembly coupled to a lift mechanism, a travel mechanism structured to displace the roller assembly relative to the support foot, one or more linking devices coupled to the support foot, and one or more biasing devices coupled to the linking devices.

Referring to FIG. 13, a flow begins at process 1305 where the lift mechanism is activated to lower the support foot to aground surface and raising a load supported by the load-bearing frame. In process 1310, the travel mechanism is activated to displace the roller assembly connected to the lift mechanism relative to the support foot and ground surface, thereby moving a position of the load. Depending on the movement of the travel mechanism relative to the support foot, the position of the support foot may be aligned with the load-bearing frame or may not be aligned with the load-bearing frame. As discussed above, when the load is moved in a direction perpendicular to the orientation of the support foot, or moved parallel to the orientation of the support foot, the support foot typically remains aligned with the load-bearing-frame. If the load is moved in a different direction relative to the support foot, such as when the load is being steered in a non-linear path, the support foot can become misaligned with the load-bearing frame. In process 1315, it is observed whether the resulting position of the support foot is aligned with the load-bearing frame.

When the support foot remains aligned with the load-bearing frame, the flow proceeds to process 1320 where the lift mechanism is activated to lower the load and raise the support foot. However, when the support foot is not aligned with load-bearing frame, the biasing device is deflected via the linking device as the load is displaced as shown in step 1325. That is, the biasing devices are deflected when movement of the roller assembly results in an angular displacement between a centerline of the support foot and an orientation of the load-bearing frame. In process 1330, the lift mechanism is activated to lower the load and raise the support foot from the ground surface. As the support foot loses contact with the ground surface, the deflected biasing device acts on the support foot to align the support foot with the load-bearing frame, as shown in step 1335. That is, the centerline of the support foot is automatically aligned relative to the orientation of the load-bearing frame. After step 1335 or process 1320, the flow may include optional process 1340 where the lift mechanism is repositioned with respect to the support foot. If further walking steps are needed to move the load to a final position, the flow may return to process 1305 to initiate another walking cycle.

As described above, some embodiments of this invention are directed to a load transporting apparatus configured to move a load over a ground surface in one or more incremental steps each including a load-movement phase and a recovery phase. To move the load, the load transporting apparatus is coupled to a load-bearing frame configured to support the load. The load transporting apparatus includes a first support foot structured to interface with the ground surface, the first support foot having a length, width, and longitudinal centerline bisecting the width of the first support foot. The load transporting apparatus also includes a second support foot structured to interface with the ground surface, the second support foot also having a length, width, and longitudinal centerline bisecting the width of the second support foot.

First and second roller tracks are respectively coupled to the first support foot and second support foot via a first king pin connector and a second king pin connector. Additionally, first and second roller assemblies are respectively positioned on the first and second roller tracks. Each roller assembly includes a roller frame and one or more rollers set in the roller frame. First and second lift mechanisms are respectively coupled to the first and second roller assemblies. Each of the first and second lift mechanisms includes a lift cylinder connected to the load-bearing frame, and a cylinder rod, where each of the first and second lift mechanisms are structured to lift the load-bearing frame at the start of the load-movement phase.

The load transporting apparatus also includes first and second travel mechanisms respectively coupled to the first and second roller assemblies, Each of the travel mechanisms are structured to move the respective roller assembly relative to the respective support foot during the load-movement phase. A first linking device coupled to the first support foot, and a second linking device coupled to the second foot. A first biasing device is connected to the first linking device, where the first biasing device is structured to become activated during aloud-movement phase when the first roller assembly is non-linearly displaced by the first travel mechanism relative to the first support foot, and structured to return the first support foot to an aligned position relative to the load-bearing frame during a recovery phase. A second biasing device is connected to the second linking device, where the second biasing device is structured to become activated during a load-movement phase when the second roller assembly is non-linearly displaced by the second travel mechanism relative to the second support foot, and structured to return the second support foot to an aligned position relative to the load-bearing frame during a recovery phase.

In some embodiments, the first linking device is coupled between the first support foot and the second support foot. In these embodiments, the second linking device is also coupled between the first support foot and the second support foot, as shown in FIG. 11, for example. In other embodiments, the first and second biasing devices are respectively coupled to the load-bearing frame, such as in FIG. 7A, for example.

Figure 14:
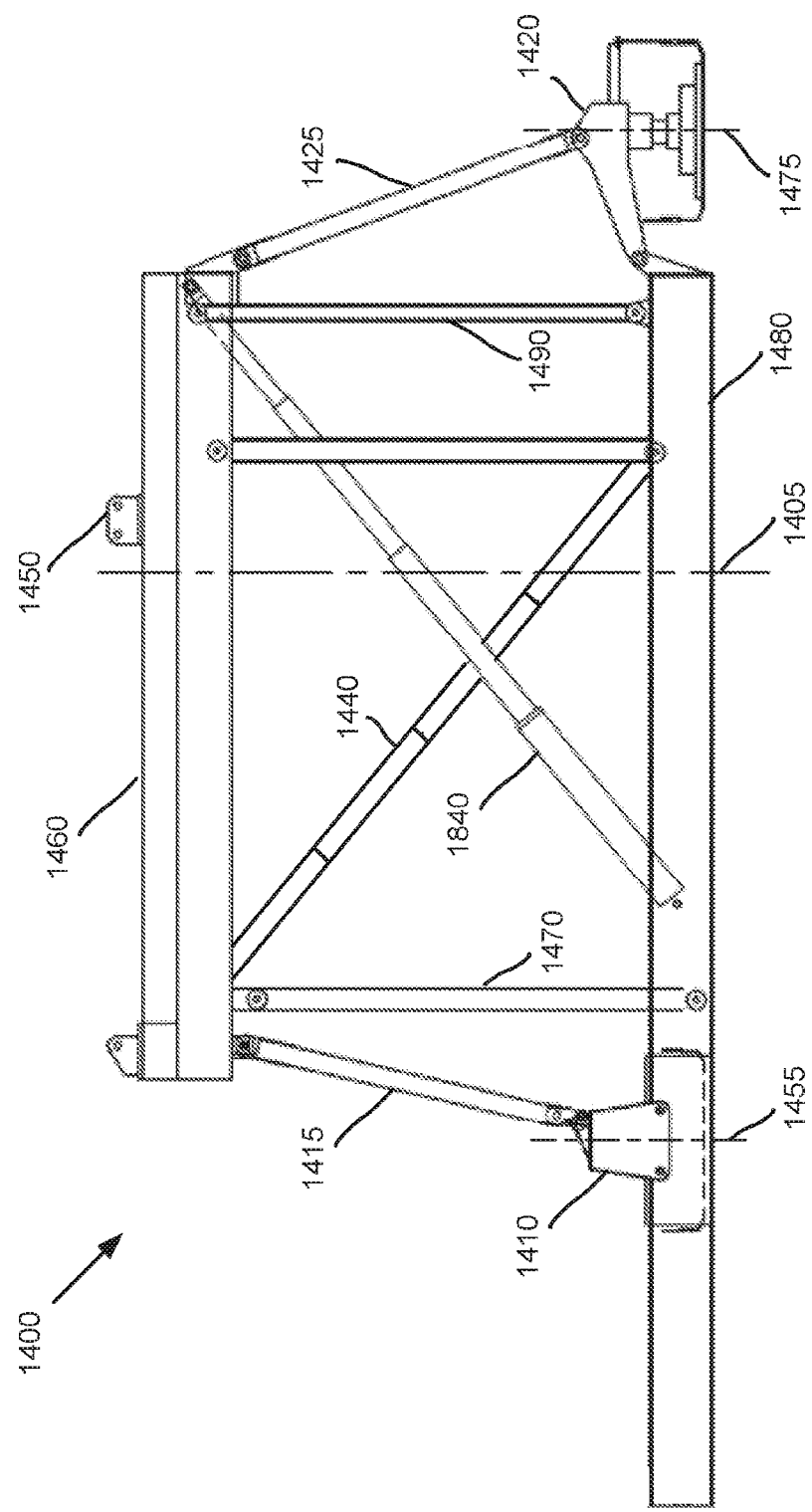
FIG. 14 illustrates an example mounting structure.

FIG. 14 illustrates an example mounting structure 1400 such as may be used to support an oil rig. Mounting structure 1400 may comprise a rig platform 1460 connected to abuse 1480 by one or more rear legs such as first leg 1470 and one or more front legs, such as second leg 1490. Rig platform 1460 may comprise a rig support structure 1450 configured to support a mast, a drill, traveling blocks, and other components associated with a rig or other type of heavy load supported by mounting structure 1400.

In some examples, mounting structure 1400 may be placed over a well head such that a well head centerline 1405 of mounting structure 1400 may be located between first leg 1470 and second leg 1490, Additionally, the rig platform 1460 may be connected to the base 1480 by one or more struts, such as rear transport strut 1415 and/or front transport strut 1425, and one or more hydraulic cylinders, such as hydraulic cylinder 1840. Hydraulic cylinder 1840 may comprise a telescoping hydraulic cylinder. Additionally, one or more telescoping struts, such as diagonal strut 1440, may be configured to provide additional support of mounting structure 1400.

Mounting structure 1400 may comprise a walking system including a number of transport systems 1410, 1420 configured to position or move mounting structure 1400 over the well head. In some examples, transport systems 1410, 1420 may comprise one or more of the transportation devices and/or systems described in U.S. Pat. No. 8,573,334, U.S. Pat. No. 8,561,733, and U.S. Pat. No. 8,490,724, or any combination thereof.

In some examples, transport struts 1415, 1425 may be configured to primarily provide structural support while transport systems 1410, 1420 are moving mounting structure 1400 and a rig and/or load supported by mounting structure 1400. In some examples, one or both of transport struts 1415, 1425 may be oriented at a diagonal angle in order to offset or redistribute the weight of the load. For example, front transport strut 1425 may be configured to provide an offset load bearing path from rig platform 1460 to transportation device 1420 located outside of, and/or in front of, base 1480.

Base 1480 may be configured to support the weight of mounting structure 1400 during operation of a rig, in which case base may be in contact with the ground or other surface upon which mounting structure 1400 is located. In some examples, transportation devices 1410, 1420 may be configured to lift base 140 and/or the entire mounting structure 1400 off the ground, such as when the rig is being moved from one well head to another well head. A first set of one or more transport devices, such as transport device 140, may be configured to lift approximately half of the weight of mounting structure 1400 at a first load bearing position 1455. A second set of one or more transport devices, such as transport device 1420, may be configured to lift approximately half of the weight of mounting structure 1400 at a second load bearing position 1475. In some examples, more than two load bearing positions may be used to lift and/or move mounting structure 1400.

Figure 15:
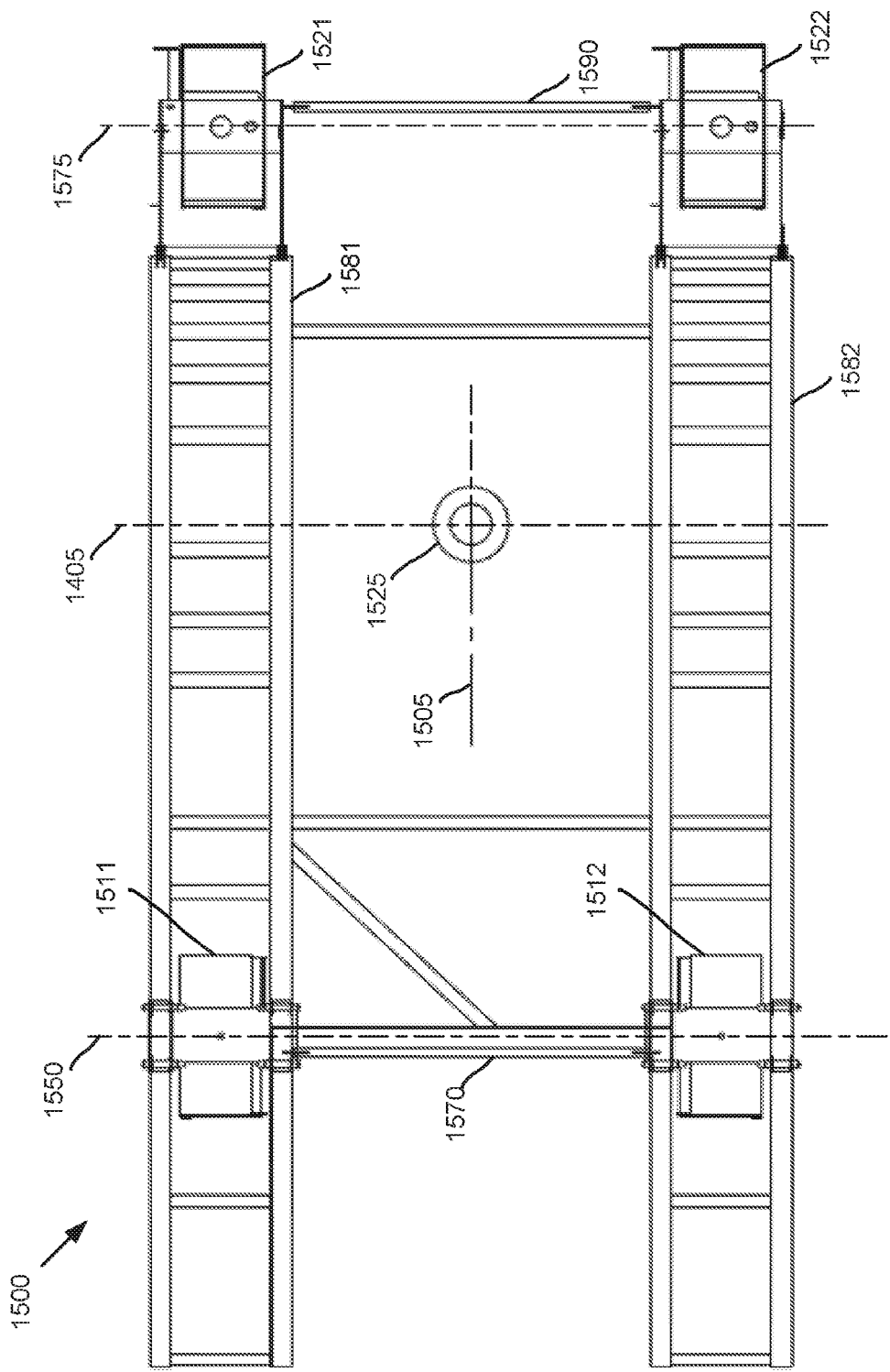
FIG. 15 illustrates a bottom view of a mounting structure.

FIG. 15 illustrates a bottom view of a mounting structure 1500 which may be configured similarly as mounting structure 1400 of FIG. 14. Mounting structure 1500 may comprise one or more struts, such as struts 1570 and 1590, connecting a left side base 1581 of mounting structure 1500 with a right side base 1582 of mounting structure 1500. A first set of transportation devices comprising a first rear transport device 1511 and a second rear transport device 1512 may be associated with a first load bearing position 1550. Additionally, a second set of transportation devices comprising a first front transport device 1521 and a second front transport device 1522 may be associated with a second load bearing position 1575.

During operation of a rig associated with mounting structure 1500, a well head 1525 may be located between first load bearing position 1550 and second load bearing position 1575. For example, well head 1525 may be located at the intersection formed by well head centerline 1505 and a longitudinal centerline 1505 of mounting structure 1500.

First rear transport device 1511 and second rear transport device 1512 are illustrated as being located within left side base 1581 and right side base 1582, respectively. Locating one or more transportation devices within the base framework may provide lateral clearance when mounting structure 1500 travels over the well head 1525, such that the well head 1525 and associated casing, valving, etc. pass between left side base 1581 and right side base 1582.

Figure 16:
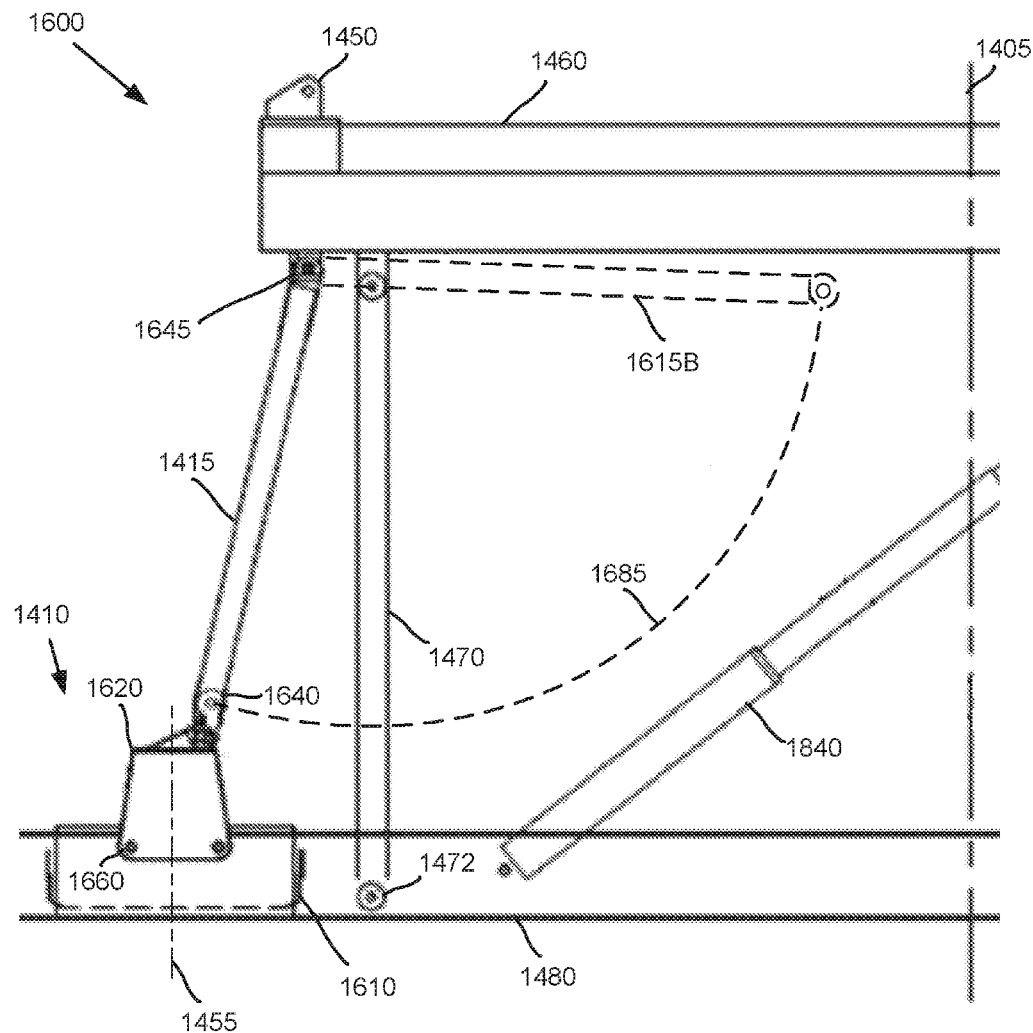
FIG. 16 illustrates an enlarged partial view of a mounting structure comprising a first support structure.

FIG. 16 illustrates an enlarged partial view of a mounting structure 1600 comprising a first transportation system, such as transport system 1410 of FIG. 14. First transport system 1410 may comprise a transport support 1620, abuse connection 1630, and/or a transportation device 1610. Transport support 1620 may be configured to connect strut 1415 to base 1480. Transport support 1620 may be connected to base 1480 via base connection 1630. In some examples, transport support 1620 may comprise one or more bolts, pins, rods, hooks, clamps, latches, other types of connection devices, or any combination thereof.

Strut 1415 may be connected to transport support 1620 at a first end 1640 of strut 1415. Additionally, strut 1415 may be connected to rig platform 1460 at a second end 1645 of strut 1415. In some examples, strut 1415 may be configured to diagonally connect rig platform 1460 to base 1480 at a point located above transportation device 1610. When mounting structure 1600 is at rest with base 1480 in contact with the ground or operating surface, the weight of the associated drill and/or load located on rig platform 1460 may be primarily borne by first leg 1470. First leg 1470 may be positioned directly below one or more support legs of rig support structure 1450.

Strut 1415 may be configured to transfer at least a portion of the weight of the drill and/or load (along with a portion of the overall weight of mounting structure 1600) from first leg 1470 to first load bearing position 1455 when mounting structure 1600 is in a raised position on transportation device 1610, e.g., when base 1480 is lifted off the ground.

One or more transportation devices; such as transportation device 1610, may be configured to raise and lower the entire mounting structure 1600 during operation of the drill, e.g. to move the drill relatively short distances from one well head centerline 1405 to another well head. However in some examples, mounting structure 1600 may be moved relatively large distances, such as from a first drilling site to another drilling site, which may be located many miles distant from each other, in which case it may be impractical to rely on transportation device 1610 to provide the sole means for transportation.

Mounting structure 1600 may be configured to be placed into a compact state for distant transportation. In some examples, one or more hydraulic cylinders, such as hydraulic cylinder 1840, may be configured to raise and/or lower rig platform 1460 with respect to base 1480. In preparation for, or in the process of, lowering mounting structure 1600 into the compact state, strut 1415 may be disconnected from one or both of base 1480 and rig platform 1460. In some examples, first end 1640 of strut 1415 may be disconnected from transport support 1620.

Strut 1415 may be rotated to an approximately horizontal transport/storage position 1615B, shown in dashed lines. Being connected to transport support 1620 at a raised elevation with respect to base 1480, first end 1640 of strut 1415 may rotate along an arc 1685 with sufficient clearance to avoid contact with base 1480 as strut 1415 is rotated into transport/storage position 1615B. The lower portion of first leg 1470 may be pivotably connected to base 1480 at a pivoting connection 1472.

Figure 17:
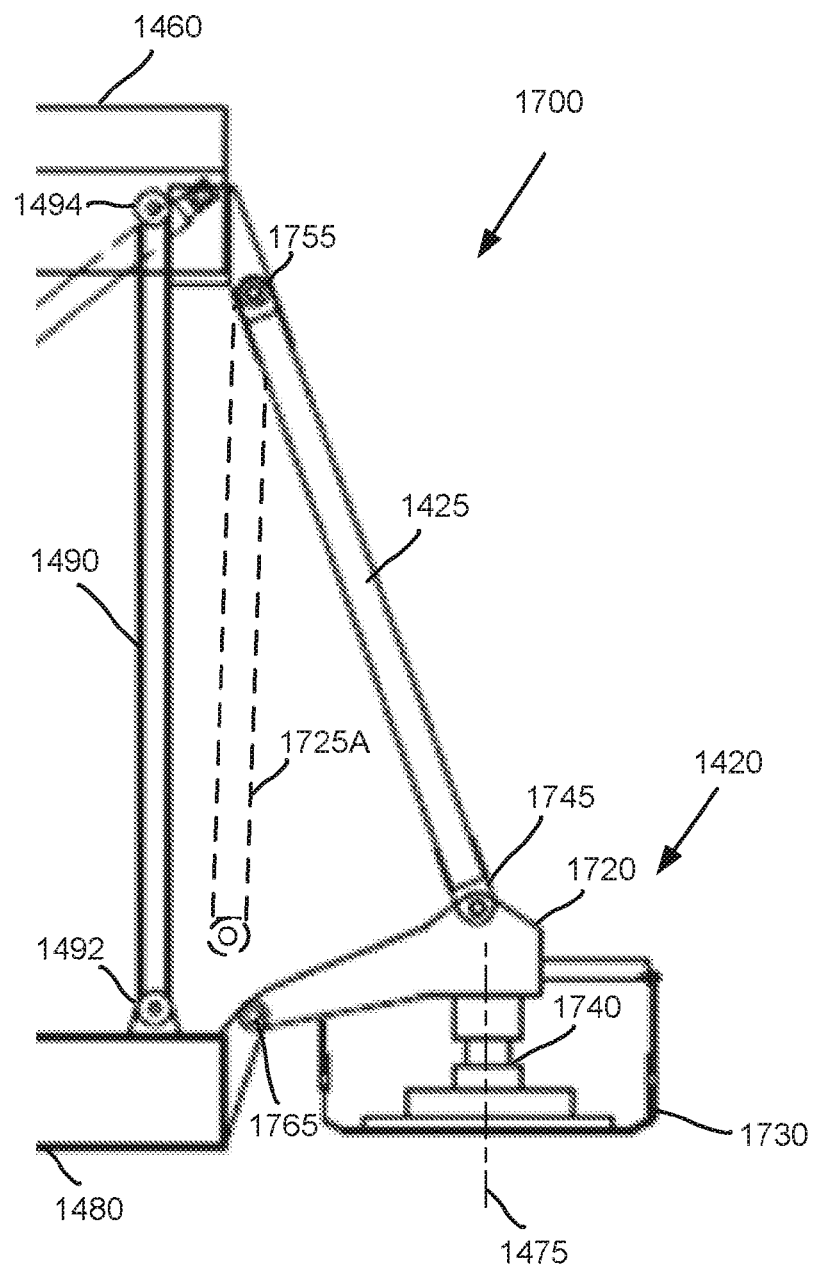
FIG. 17 illustrates an enlarged partial view of a mounting structure comprising a second support structure.

FIG. 17 illustrates an enlarged partial view of a mounting structure 1700 comprising a second transport system, such as transport system 1420 of FIG. 14. Second transport system 1420 may comprise a transport support 1720 and/or a transportation device 1730. Transportation device 1730 may comprise a hydraulic device 1740 configured to lift, lower, move, and/or rotate transportation device 1730 with respect to transport support 1720.

Transport support 1720 may be configured to connect strut 1425 to base 1480. In some examples, strut 1425 may be connected to transport support 1720 at a point above transportation device 1730. Additionally, transport support 1720 may be connected to base 1480 at a connection point 1765. In some examples, connection point 1765 may provide for a pivot point about which at least a portion of second transport system 1420 may rotate and/or be raised. Transportation device 1730 may be located in front of rig platform 1460 and/or in front of base 1480.

Strut 1425 may be connected to transport support 1720 at a first end 1745 of strut 1425. Additionally, strut 1425 may be connected to rig platform 1460 at a second end 1755 of strut 1425. In some examples, strut 1425 may be configured to diagonally connect rig platform 1460 to transport support 1720 at the point located above transportation device 1730. When mounting structure 1700 is at rest with base 1480 in contact with the ground or operating surface, the weight of the associated drill and/or load located on rig platform 1460 may be primarily borne by second leg 1490. In some examples, second leg 1490 may be positioned directly below one or more support legs of rig support structure 1450 (FIG. 14).

Strut 1425 may be configured to transfer at least a portion of the weight of the drill and/or load (along with a portion of the overall weight of mounting structure 1700) from second leg 1490 to second load bearing position 1475 when mounting structure 1700 is in a raised position on transportation device 1730, e.g., when base 1480 is lifted off the ground.

One or more transportation devices, such as transportation device 1730, may be configured to raise and lower the entire mounting structure 1700 during operation of the drill, e.g. to move the drill relatively short distances from one well head centerline to another. Additionally, mounting structure 1600 may be configured to be placed into a compact state for distant transportation. Strut 1425 may be rotated about second end 1855 towards a transport/storage position 1825A, shown in dashed lines, Being connected to transport support 1820 at a raised elevation with respect to base 1480, first end 1845 of strut 1425 may rotate with sufficient clearance to avoid contact with base 1480 as strut 1425 is rotated into transport/storage position 1825A.

Figure 18A:
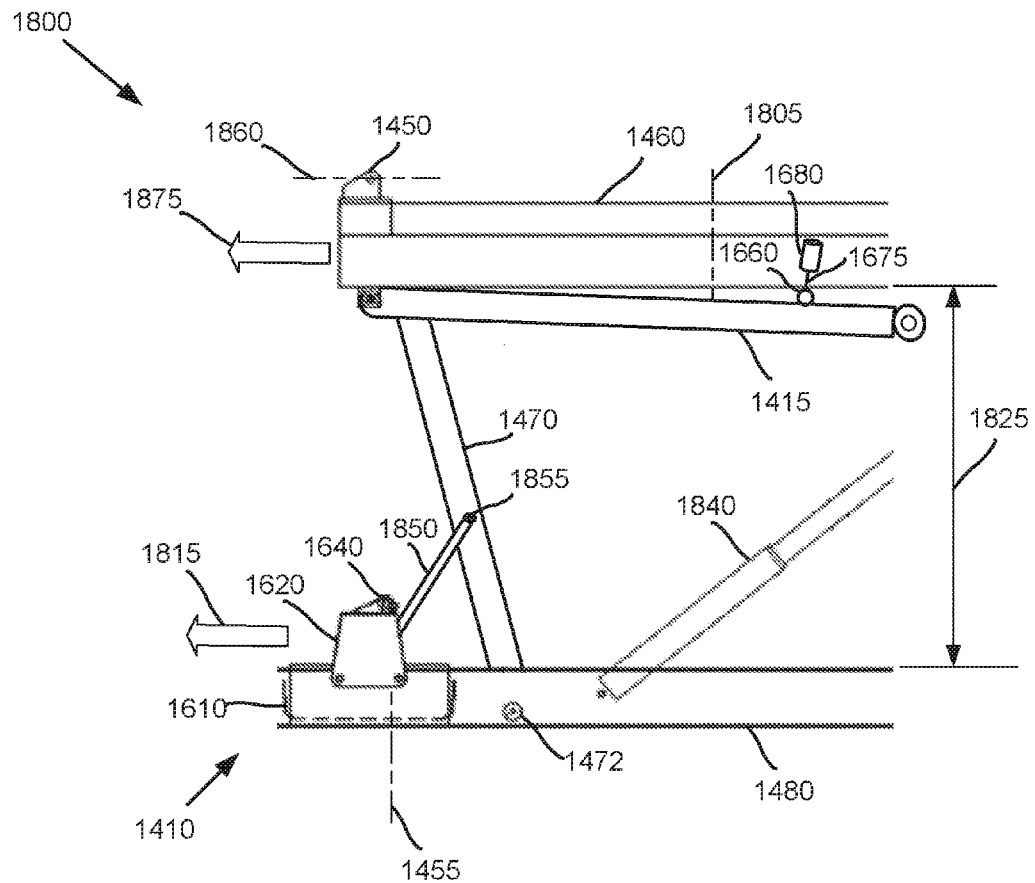
FIG. 18A illustrates a first portion of the mounting structure of FIG. 14 in a partially collapsed transport/storage position.

FIG. 18A illustrates a first portion of the mounting structure 1400 of FIG. 14 in a partially collapsed transport position, in which strut 1415 is shown in an approximately horizontal storage position. Strut 1415 may comprise a latch point 1660 configured to lift and/or securely connect strut 1415 to rig platform 1460. In some examples, a cable 1675 may extend between latch point 1660 and a lifting mechanism 1680 attached to rig platform 1460 to facilitate the rotation of strut 1415 into the horizontal transport/storage position.

The rig platform 1460 is shown as having been lowered to a partially collapsed height 1825 with respect to base 1480. Hydraulic cylinder 1840 is shown in a partially extended position as first leg 1470 pivots rig platform 1460 downward, causing a rig centerline 1805 associated with rig platform 1460 to move away from, e.g., to the left 1875 of well head centerline 1405 (FIG. 14). In some examples, the rig and/or load may be removed from mounting structure 1400 prior lowering rig platform 1460, such that the overall height 1860 of mounting structure 1400 may be associated with rig support structure 1450.

A push-pull rod 1850 or connecting member may operatively connect transport support 1620 of first transport system 1410 to first leg 1470. Push-pull rod 1850 may be rotatably connected to first leg 1470 at a pivoting connection 1855 and may be configured to push and/or pull at least a portion of first transport system 1410 in response to the rotation of first leg 1470 about pivoting connection 1472. In some examples, push-pull rod 1850 may be configured to push transport support 1620 and/or transportation device 1610 away from well head centerline 1405 in a substantially lateral direction 1815. At least a portion of first transport system 1410, such as transport support 1620 and/or transport device 1610, may be moved away from first load bearing position 1455 in response to lowering rig platform 1460. Push-pull rod 1850 may push transport support 1620 in the lateral direction 1815 as first leg 1470 pivots about pivoting connection 1472 with respect to base 1480. In some examples, transport support 1620 may be moved in the lateral direction 1815 after being disconnected from strut 1415.

Figure 18B:
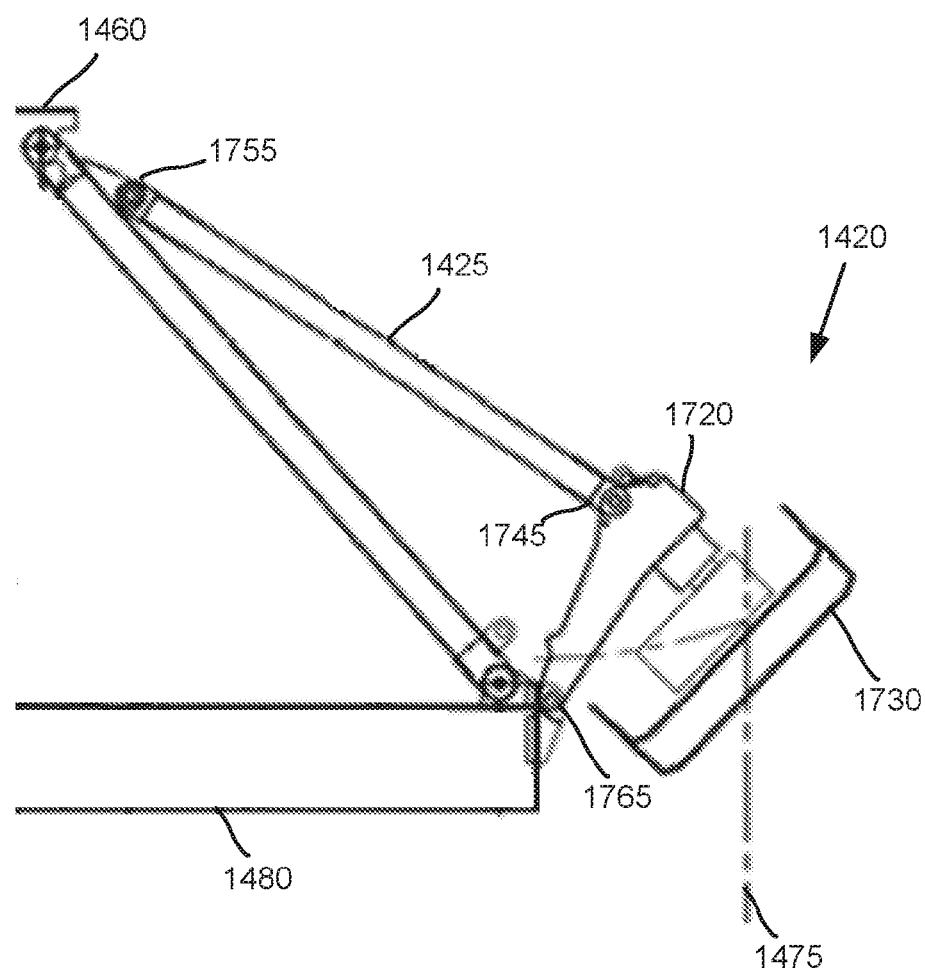
FIG. 18B illustrates a second portion of the mounting structure of FIG. 14 in a partially collapsed transport/storage position.

FIG. 18B illustrates a second portion of the mounting structure 1400 of FIG. 14 in a partially collapsed transport/storage position. At least a portion of second transport system 1420, such as transport support 1820 and/or transport device 1830, may be moved away from second load bearing position 1475 in response to lowering rig platform 1460 towards base 1480. In some examples, as rig platform 1460 is being lowered to the partially collapsed transport position, strut 1425, or another connecting member, may be configured to lift and/or rotate at least a portion of second transport system 1420 about connection point 1865. In some examples, one or both of first end 1845 and second end 1855 of strut 1425 may be configured to allow strut 1425 to pivot with respect to rig platform 1460 and transport support 1820, respectively.

Figure 19:
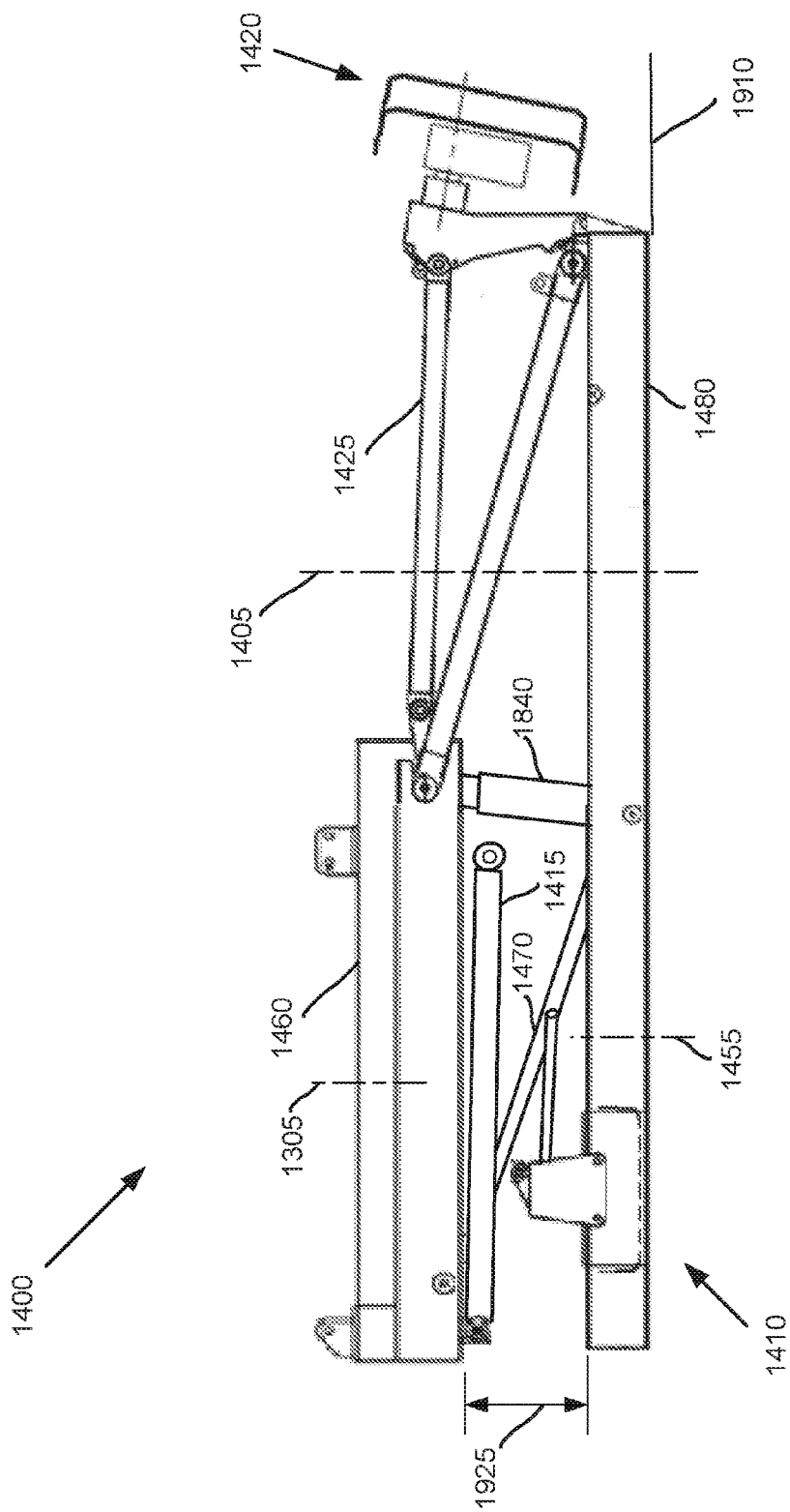
FIG. 19 illustrates the mounting structure of FIG. 14 in a fully collapsed position.

FIG. 19 illustrates the mounting structure 1400 of FIG. 14 in a fully collapsed transport/storage position. Both strut 1415 and strut 1425 are shown in a substantially horizontal transport/storage position, and hydraulic cylinder 1840 is shown in a retracted position. The rig platform 1460 is shown as having been lowered to a collapsed height 1925 with respect to base 1480. Rig centerline 1805 associated with rig platform 1460 has moved away from well head centerline 1405, such that substantially the entire rig platform 1460 is positioned to the left of well head centerline 1405.

At least a portion of transport system 1410 has also been laterally moved away from first load bearing position 1455 in response to lowering rig platform 1460, such that first transport system 1410 and/or second transport system 1420 does not interfere with the reduced overhead clearance associated with one or more struts, cylinders, or legs, such as first leg 1470, in the fully collapsed transport position of mounting structure 1400. Additionally, at least a portion of second transport system 1420 may be rotated and/or raised in response to lowering rig platform 1460 such that second transport system 1420 is no longer in contact with the ground and/or surface 1910. In some examples, an upper portion of second transport system 1420 may be rotated and/or moved independent of a lower portion of second transport system 1420.

By rotating second transport system 1420, the length of mounting structure 1400 may be reduced. In some examples, the overall length of mounting structure 1400 in the fully collapsed transport/storage position may be equal to, or approximate, the length of base 1480.

Figure 20:
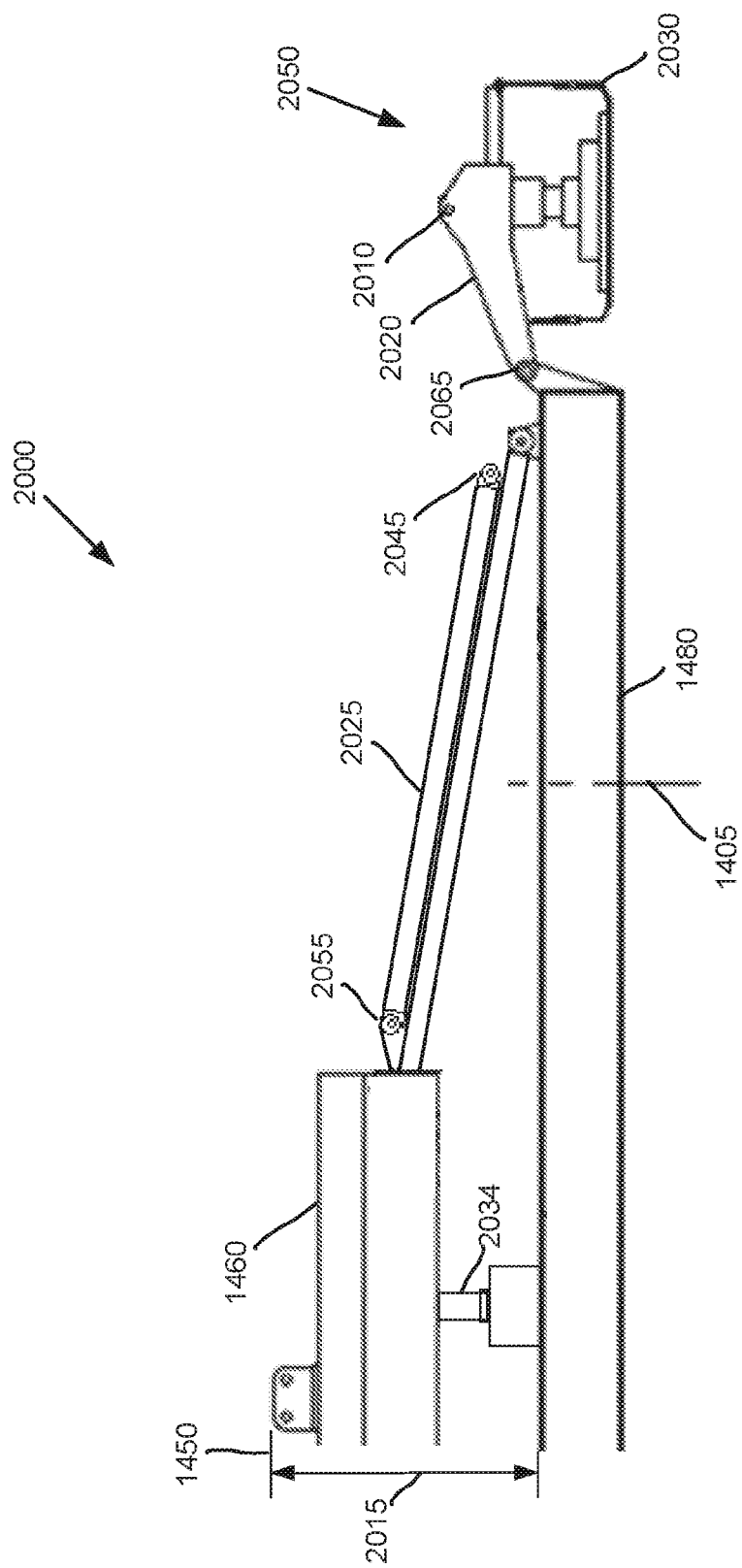
FIG. 20 illustrates a mounting structure, such as the mounting structure of FIG. 14, in an alternative example transport/storage position.

FIG. 20 illustrates a mounting structure 2000, including an example transport system 2050 in an alternative transport/storage position. A first end 2045 of a strut 2025 is shown disconnected from a transport support 2020 of transport system 2050, such that transport support 2020 and a corresponding transport device 2030 may remain adjacent to base 1480, e.g., on the ground, with rig platform in the fully collapsed transport/storage position. Rig platform 1460 is shown moved to off to one side of well head centerline 105 and an overall height 2015 of mounting structure 2000 may determined for the highest point of the rig and/or rig support structure 1550 in the fully collapsed position.

Transport support 2020 may comprise a lift point 2010 configured to provide means for lifting and/or rotating at least a portion of transport system 2050. Lift point 2010 may be fitted with a cable and a hoist may be used to lift or rotate transport support 2020 and/or transport device 2030 off the ground. In some examples, transport support 2020 may be disconnected from base 1480 at a connection point 2065, such that at least a portion of transport system 0250 may be separately transported and/or stored from mounting structure 0200. In still other examples, transport system 0250 may be placed on base 1480 or on rig platform 1460 during transport and/or during storage of mounting structure 2000.

One or more support braces 2034 may be configured to support the weight of rig platform 1460 in the fully collapsed transport/storage position. Additionally, the one or more support braces 2034 may be configured to maintain clearance between transport system 2050 and/or transport systems 1410, 1420 (FIG. 19) and one or more struts, cylinders, or legs, such as first leg 1470 and strut 1415, with mounting structure 2000 in the fully collapsed transport/storage position.

Figure 21:
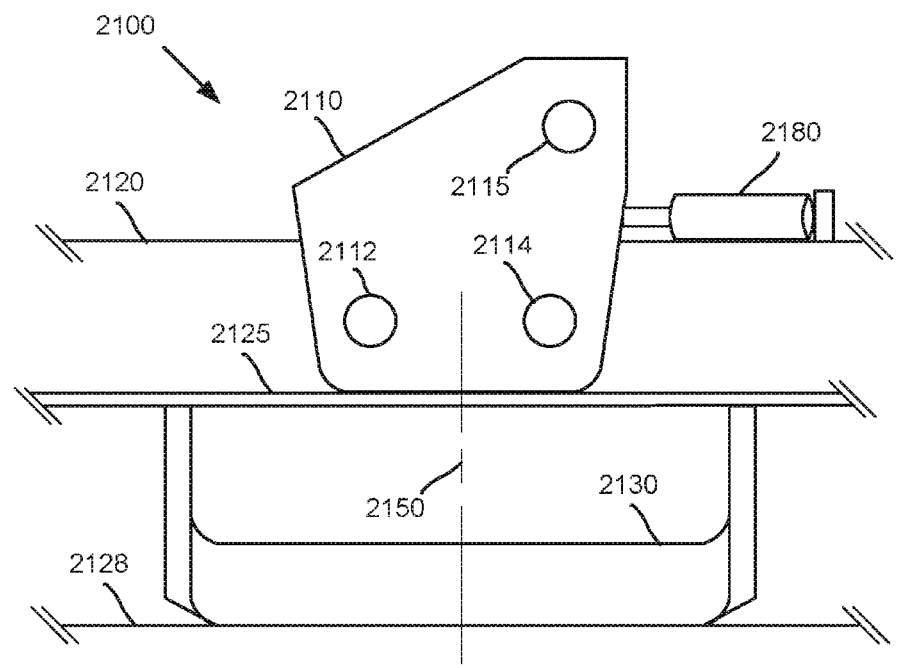
FIG. 21 illustrates an example support structure.

FIG. 21 illustrates an example support structure 2100 in a first mode of operation. The first mode of operation may be associated with operation of support structure 2100 during a drilling operation or during a rig walking operation. During the first mode of operation, the bottom of a base 2120 may be in contact with the ground or other surface 2128 upon which support structure 2100 may be placed on.

An upper portion 2110 of a transport system may be mounted to base 2120. In some examples, upper portion 2110 may comprise a number of mounting devices 2112, 2114 or holes through which one or more bolts, pins, rods, hooks, clamps, latches, or other types of connection devices may be used to mount upper portion 2110 to base 2120. Additionally, upper portion 2110 may comprise a connection device 2115 for connecting to a strut or other type of support member, such as strut 1415 (FIG. 14). Support structure 2110 may be connected to a push-pull device 2180, or connecting member, shown in a retracted position. Push-pull device 2180 may comprise a hydraulic cylinder, a jack, a piston, a gear, a winch, a roller, a track, other types of pushing devices or pulling devices such as push-pull rod 1850 (FIG. 18A), or any combination thereof. In some examples, push-pull device 2180 may be connected to support structure 2110 at a first end of push-pull device 2180 and may be connected to base 2120 at a second end of push-pull device 2180.

The transport system associated with support structure 2100 may be approximately centered about a load bearing path 2150. In some examples, a transport device 2130 may be configured to lift base 2120 along load bearing path 2150. Upper portion 2110 may be configured as a transport support, e.g., to operably connect transport device 2130 to base 2120. Additionally, upper portion 2110 may be configured to transfer the weight of a load supported by base 2120 onto the transport device 2130. In some examples, upper portion 2110 may be configured to transfer or offset the effective weight of the load onto the load bearing path 2150 that passes through transport device 2130.

Base 2120 may comprise a connecting structure 2125, which may be configured as a substantial) horizontal plate. In some examples upper portion 2110 may be located above and/or on top of connecting structure 2125, such that mounting devices 2112, 2114 may attach to an upper portion of base 2120. Connecting structure 2125 may be located at an approximate vertical mid-point of base 2120. In some examples, connecting structure 2125 may be used to help locate upper portion 2110 with respect to base 2120. Additionally, connecting structure 2125 may provide vertical support of the weight that is transferred from upper portion 2110 to the load bearing path 2150 associated with transport device 2130.

Figure 22:
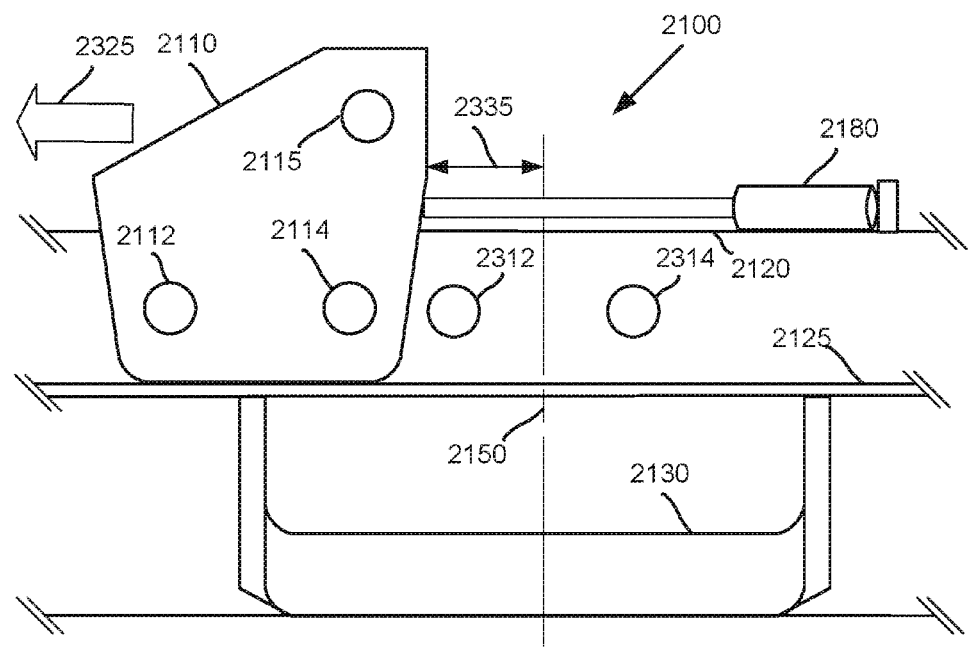
FIG. 22 illustrates the example support structure of FIG. 21 in a transport/storage position.

FIG. 22 illustrates the example support structure 2100 of FIG. 21 in a second mode of operation, in which upper portion 2110 has been moved in a lateral direction 2225 away from load bearing path 2150. Upper portion 2110 may be moved far enough in the lateral direction 2225 to provide a lateral clearance 2235 with load bearing path 2150. The second mode of operation may be associated with the storage and/or long distance transport of support structure 2100.

A number of receiving devices 2212, 2214 may be located in base 2120. Receiving devices 2212, 2214 may comprise through-holes which correspond in number and relative position with mounting devices 2112, 2114 of upper portion 2110. For example, a first pin or bolt may be placed through corresponding holes associated with mounting device 2112 and receiving device 2212 with support structure configured in the first mode of operation (FIG. 21), and a second pin or bolt may be placed through corresponding holes associated with mounting device 2114 and receiving device 2214 in the first mode of operation.

The first pin and/or second pin may be configured to impede movement of upper portion 2110 in the lateral direction 2225. The pins/bolts may be removed so that upper portion 810 is allowed to move in the lateral direction 2225 during the second mode of operation. Upper portion 2110 may be configured to slide along connecting structure 2125. In some examples, some or all of transport device 2130 may also move in the lateral direction 2225 together with upper portion 2110.

Connection device 2115 may be disconnected from a strut or other type of support member prior to upper portion 2110 being moved in the lateral direction 2225. In other examples, the push-pull device 2180, shown in an extended position, may be configured to push and/or pull upper portion 2110 in the lateral direction 2225.

Figure 23:
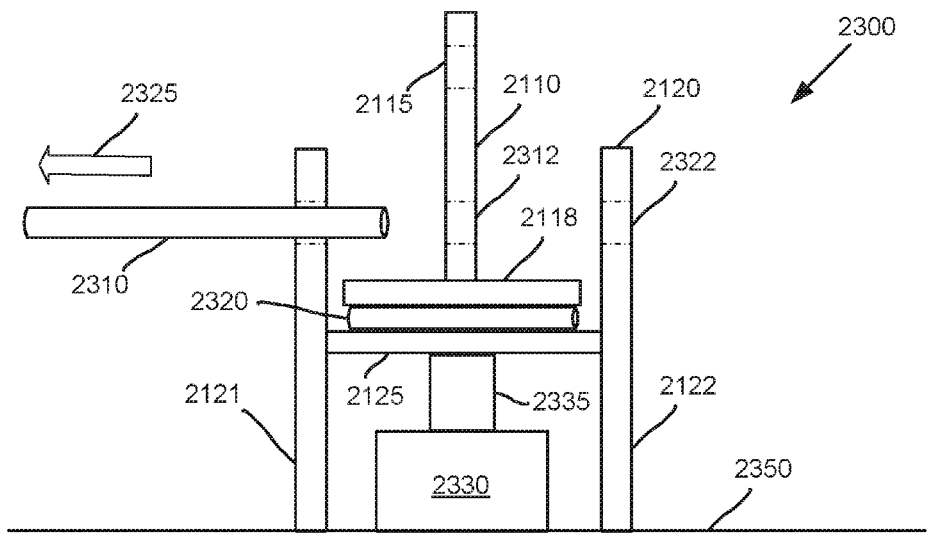
FIG. 23 illustrates a further example support structure.

FIG. 23 illustrates a further example support structure 2300 including the base 2120 and upper portion 2110 of FIG. 22 shown in a cross-sectional view. Base 2120 may comprise a first base plate 2121 and a second base plate 2122 connected by connecting structure 2125. One or more holes, such as through-hole 2322, may penetrate through one or both of first base plate 2121 and second base plate 2122. Additionally, upper portion 2110 may comprise one or more holes such as through-hole 2312. A connection device 2310 is shown in a partially withdrawn position 2325 and extending outside of a hole in first base plate 2121. Connection device 2310 may comprise a bolt, pin, rod, hook, clamp, latch, other types of connection device, or any combination thereof, that may be inserted through upper portion 2110 and base 2120 via one or more through-holes 2312, 2322.

Upper portion 2110 may be positioned directly above a transport device 2330 configured to lift and/or rotate base 2120. In some examples, a rotation/translation device 2335 may be configured to rotate and/or translate transport device 2330 within the base frame defined by first base plate 2121 and second base plate 2122. First base plate 2121 and second base plate 2122 may rest on the ground or surface 2350 when base 2120 is not being lifted by transport device 2330.

One or more rollers 2320 may be placed between a contact surface 2118 of upper portion 2110 and connecting structure 2125 to facilitate moving or rolling upper portion 2110 with respect to base 2120. In some examples, connection device 2310 may be removed entirely from through holes 2312, 2322 and used as a roller between contact surface 2118 and connecting structure 2125. In other examples, upper portion 2110 may be configured to slide via direct contact between contact surface 2118 and connecting structure 2125 without the use of any rollers, Connection device 2115 may be disconnected from a strut or other type of support member prior to upper portion 2110 being moved on the one or more rollers 2320. In other examples, a push-pull device attached to connection device 2115 may be configured to push and/or pull upper portion 2110.

Figure 24:
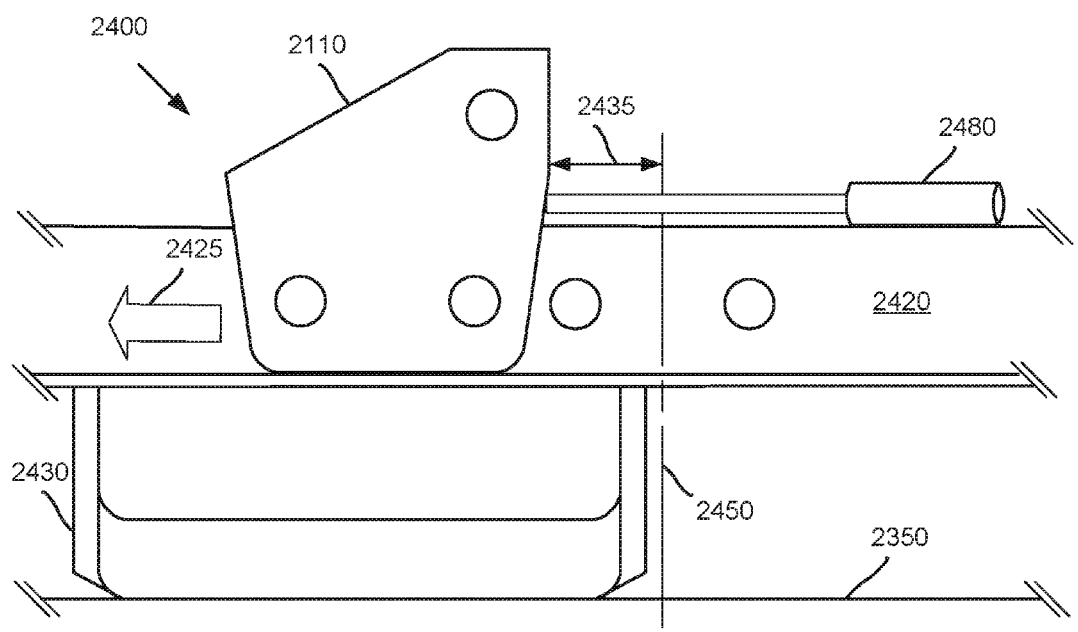
FIG. 24 illustrates an example support structure in a transport/storage position.

FIG. 24 illustrates a further example support structure 2400 in a transport/storage position. In some examples, substantially the entire support structure 2400 including an upper portion 2410 of support structure 2400 and a corresponding transport device 2430 may be moved in a lateral direction 2425 away from aloud bearing path 2450. Transport device 2430 may be mounted, bolted, welded, or otherwise connected to upper portion 2410. Upper portion 2410 may be moved far enough in the lateral direction 2425 to provide a lateral clearance 2435 with load bearing path 2450. Similarly, transport device 2430 may be moved away from load bearing path 2450.

Upper portion 2410 may be configured to slide, roll, or otherwise move along one or more surfaces or rails of a base structure 2420. Additionally, transport device 2430 may be configured to slide, roll, or otherwise move along the ground or surface 2350 in the lateral direction 2425. In some examples, support structure 2400 may comprise a hydraulic cylinder or other device configured to lift transport device 2430 off of the ground or surface 2350. Transport device 2430 may be moved in the lateral direction 2425 in a raised position.

A push-pull device 2480 or connecting member, shown in an extended position, may be connected to one or both of upper portion 2410 of support structure 2400 and transport device 2430. In sonic examples, push-pull device 2480 may comprise similar structural features, or be configured similarly, as push-pull device 2180 (FIG. 21).

When support structure 2300 is located in the transport/storage position, it may be operably disconnected from base structure 2320 such that support structure 2300 may no longer be configured to provide a lifting function of base structure 2320 and/or of an associated rig that may be mounted to base structure 2320. After the rig has been moved to a new location, support structure 2300 may be moved back to an operational position, e.g., with a centerline of transport device 2330 approximately aligned with load bearing path 2350, so that support structure 2300 may again be configured to provide the lifting function.

Figure 25:
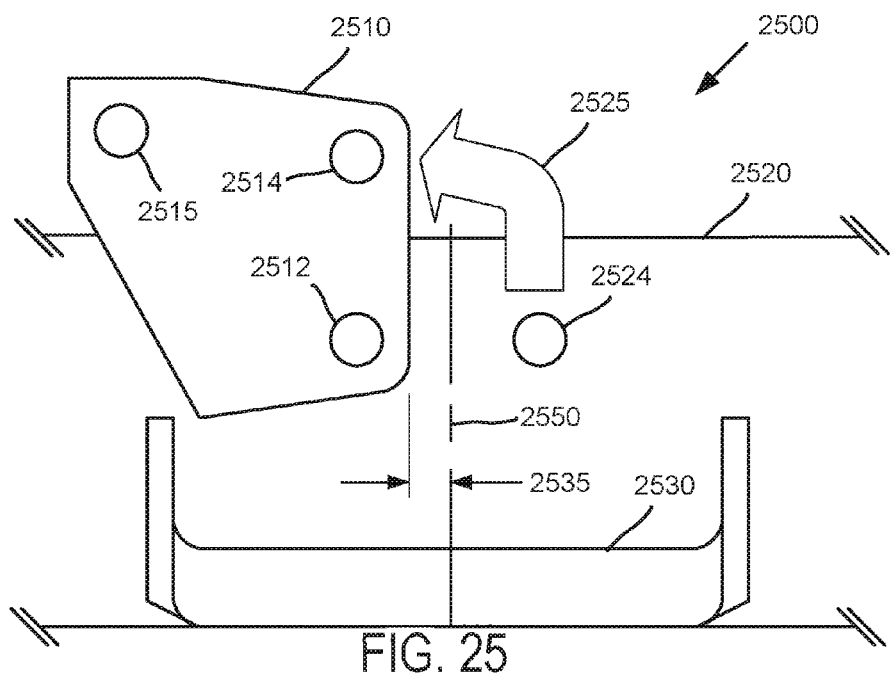
FIG. 25 illustrates a further example support structure in a transport/storage position.

FIG. 25 illustrates yet another example support structure 2500 comprising an upper portion 2510 of a transport system configured to rotate about a pivot point 2512. Pivot point 2512 may comprise a bolt, a pin, a rod, or other type or pivot point configured to pivotably connect upper portion 2510 with a base 2520. In some examples, upper portion 2510 may be configured to mount to base 2520 at both pivot point 2512 and at connection point 2514. Connection point 2514 may align with a receiving point 2524 on base in a first mode of operation associated with transport device 2530, and a pin, rod, hook, clamp, latch, other types of connection device, or any combination thereof, may be used to attach connection point 2514 with receiving point 2524.

Connection point 2514 is shown in a rotated position 2525, e.g., during a second mode of operation, up and away from receiving point 2524, such that a lateral clearance 2535 is formed between upper portion 2510 and a load bearing path 2535 associated with transport device 2530. The second mode of operation may be associated with storage and/or a long distance transport operation of base 2520.

A connection device located at connection point 2514 and/or at receiving point 2524 may be removed to allow connection point 2514 to pivot to the rotated position 2525. On the other hand, upper portion 2510 may be rotated while a second connection device remains connected at pivot point 2512.

In some examples, upper portion 2510 may be rotated and/or moved to rotated position 1225 independent of any movement of transport device 2530. In other examples, the rotation of upper portion 2510 may cause some or all of transport device 2530 to also rotate.

Figure 26:
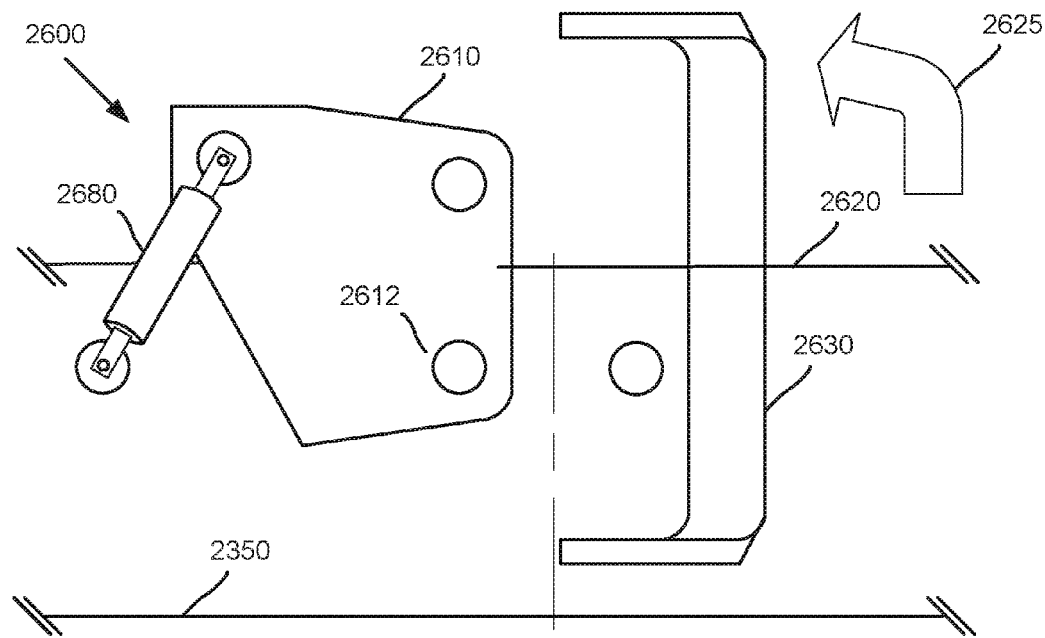
FIG. 26 illustrates yet another example support in a transport/storage position

FIG. 26 illustrates yet another example support structure 2600 in a transport/storage position. Substantially the entire support structure 2600 including an upper portion 2610 of support structure 2600 and a corresponding transport device 2630 of support structure 2600 may be moved in a rotational direction 2625 about a rotational axis 2612, such that transport device 2630 may be lifted off of the ground or surface 2350. In some examples, transport device 2630 may be rotated from an approximately horizontal orientation associated with a lifting function, to a substantially vertical orientation associated with the transport/storage position. Transport device 2630 may be mounted, bolted, welded, or otherwise connected to upper portion 2610.

A push-pull device 2680, shown in a retracted position, may be connected to one or both of upper portion 2610 of support structure 2600 and transport device 2630, In some examples, push-pull device 2680 may comprise similar structural features, or be configured similarly, as push-pull device 2180 (FIG. 21).

When support structure 2600 is located in the transport/storage position, it may be operably disconnected from a base structure 2620 such that it may no longer be configured to provide a lifting function of base structure 2620 and/or of an associated rig that may be mounted to base structure 2620.

Figure 27:
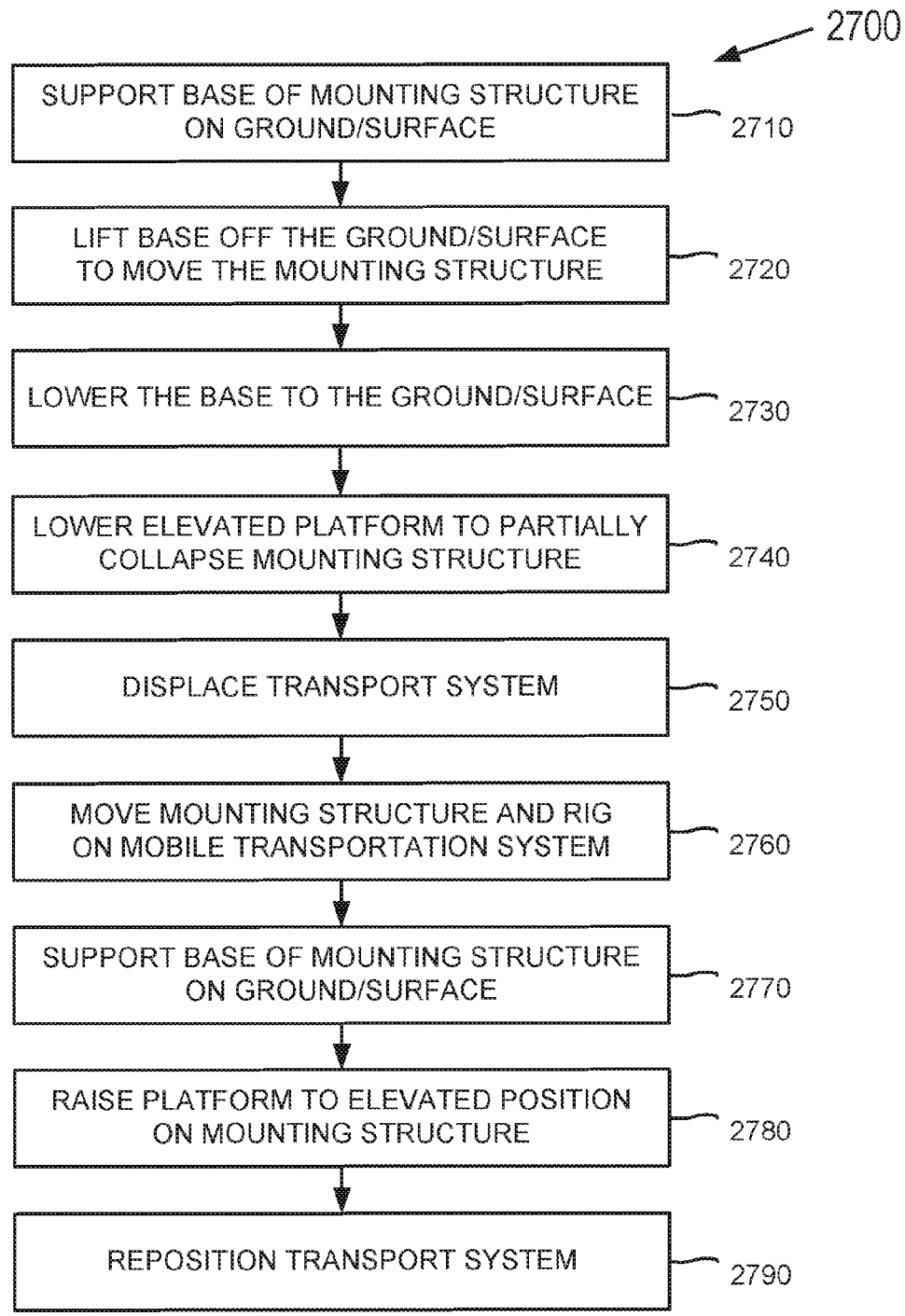
FIG. 27 illustrates an example operation associated with a mounting structure having a storable transport system.

FIG. 27 illustrates an example process 2700 associated with a mounting structure having a storable transport system. At operation 2710, a base of the mounting structure may be supported on an operating surface, such as the ground, a mat, a pad, a platform, a barge, or other type of surface. The base may be connected to an elevated platform of the rig with one or more support beams. In some examples, at least one of the support beams may comprise a diagonal strut connecting the elevated platform to the base structure. By way of illustrative example only, an extraction of a petroleum-based resource may be performed at a first, or initial, location. In other examples, operations performed at the initial location may include drilling a hole, inserting a pipe, fracking, other types of operations, or any combination thereof.

At operation 2720, the base of the mounting structure may be lifted off of the operating surface by a rig transport system to move the mounting structure to a destination and/or a second location, following the operation performed at the initial location. The mounting structure may be repositioned by moving the base from the initial location to the new location while a rig is supported by the mounting structure.

In some examples, mounting structure may be positioned by a first rig transport system positioned at the rear end of the mounting structure and a second rig transport system positioned at a front end of the mounting structure, opposite the rear end. The mounting structure may be positioned by raising the rear end of the mounting structure with the first rig transport system. Positioning the mounting structure may further comprise raising the front end of the mounting structure with the second rig transport system. In other examples, one or more transport systems may be located at different or additional locations with respect to the mounting structure.

At operation 2730, the base of the mounting structure may be lowered by the rig transport system to the operating surface at the destination and/or at the second location, A second operation may be performed at the second location.

At operation 2740, an elevated rig platform connected to the base by a plurality of support struts may be lowered. The elevated platform may be lowered while the base is in contact with the operating surface. At least some of the support struts may comprise a mounting connection that pivots to lower the rig platform toward the base. In some examples, the rig platform is lowered towards the base at the completion of an operation, such as where the mounting structure and/or rig are being prepared for storage and/or long distance transportation.

At operation 2750, at least a portion of the rig transport system may be displaced by a connecting member in response to the rig platform being lowered. The portion of the rig transport system may be displaced by the connecting member while the base remains in contact with the operating surface. The connecting member may be configured to attach the portion of the rig transport system to one of the support struts that includes a pivoting mounting connection.

In some examples, at least a portion of the rig transport system may be displaced in order to provide a more compact mounting structure in the collapsed state. Additionally at least a portion of the rig transport system may be displaced in order to provide additional clearance between the rig transport system and one or more components attached to the rig platform being lowered to the base.

In some examples, the rig transport system may be configured to contact the operating surface at a load bearing position while lifting the mounting structure at operation 2720. The connecting member may be configured to displace the portion of the rig transport system away from the load bearing position while the rig platform is being lowered at operation 2740.

The base may comprise two walls connected by a substantially horizontal connecting structure or plate. One or both of the two walls may be configured to contact the operating surface when the mounting structure is not being lifted by the rig transport system. In some examples, the rig transport system fits between the two walls. Additionally, the rig transport system may comprise a transport device or walker that is configured to rotate with the confines of the two base walls. The portion of the rig transport system that is displaced may be located above the horizontal connecting structure. In some examples, the portion of the rig transport system may be laterally displaced along the horizontal connecting structure in response to the rig platform being lowered.

The base may extend substantially along an entire length of the mounting structure, and at least one of the rig transport systems may be connected to an end of the base. The portion of the rig transport system may be rotationally displaced about the end of the base in response to the rig platform being lowered.

At operation 2760, the entire mounting structure and/or rig may be transported on a mobile transportation system such as one or more semi-trucks, rail cars, barges, other transportation vehicles, or any combination thereof. The mounting structure may be transported to a storage facility, and in some examples the mounting structure may be transported to a new operational site or destination which may be located many miles away from the present location. The mounting structure may be transported in the partially collapsed or completely collapsed position.

At operation 2770, the support base of the mounting structure may be placed on the ground and/or on a support surface at the destination.

At operation 2780, the rig platform may be raised to an elevated position on the mounting structure. The rig platform may be raised while the base is in contact with the operating surface. The mounting connections of the one or more support struts may pivot to raise the rig platform to the elevated position. In some examples, the rig platform may be raised to the elevated position prior to performing an operation at the destination.

At operation 2790, at least a portion of the rig transport system may be repositioned by the connecting member in response to the rig platform being raised. The portion of the rig transport system may be repositioned and/or displaced by the connecting member while the base remains in contact with the operating surface. The connecting member may be configured to attach the portion of the rig transport system to one of the support struts that includes a pivoting mounting connection.

In some examples, the rig transport system may be configured to move the mounting structure between one or more drill sites at the destination with the rig platform in the raised position and with the portion of the rig transport system repositioned above a load bearing position of a corresponding transport device, such as a walker.

Some or all of the example structures discussed above with respect to FIGS. 14-27 may be configured to allow the rig platform to collapse down to the base during break-down or transportation of the rig to a drill site. In some examples, the examples may comprise connections that provide pivot points where they connect to one or more of the struts, braces, and/or legs.

A rig may be modified with one or more of the struts, legs, braces, connections, and/or structural features described with reference to FIGS. 14-27 to enable the placement of a draw-works on a rig and/or rig platform. The placement of the structural features, such as the struts, provides the ability to maintain a structural load path of the original rig design while drilling, after the rig has been modified.

Some examples have been described above, and in addition, some specific details are shown for purposes of illustrating the inventive principles. However, numerous other arrangements may be devised in accordance with the inventive principles of this patent disclosure. Further, well known processes have not been described in detail in order not to obscure the novel features. Thus, while examples are described in conjunction with the specific embodiments illustrated in the drawings, the examples are not limited to these embodiments or drawings.

The invention claimed is:

1. A load transporting apparatus comprising:
   a support foot comprising a centerline;
   a roller assembly operably coupled to the support foot;
   a lift mechanism operably coupled to the roller assembly and configured to lift and lower the support foot relative to a load bearing frame;
   a travel mechanism configured to displace the roller assembly relative to the support foot such that an orientation of the load bearing frame moves out of alignment relative to the centerline of the support foot; and
   one or more biasing devices configured to elastically deform in response to the orientation of the load bearing frame moving out of alignment relative to the centerline of the support foot, wherein the resulting elastic deformation of the one or more biasing devices provides a biasing force that operates to realign the centerline of the support foot with the orientation of the load bearing frame.

2. The apparatus of claim 1, wherein the one or more biasing devices comprise a torsion bar substantially aligned with the orientation of the load bearing frame.

3. The apparatus of claim 1, further comprising one or more linking devices operably coupled to both the support foot and the one or more biasing devices.

4. The apparatus of claim 3, wherein the one or more linking devices comprise a first linking device operably coupled to a first end of the support foot, and a second linking device operably coupled to a second end of the support foot opposite the first end of the support foot.

5. The apparatus of claim 4, wherein the one or more biasing devices comprise a torsion bar operably coupled to both the first linking device and the second linking device.

6. The apparatus of claim 5, wherein the torsion bar is configured to undergo a torqueing force in response to the orientation of the load bearing frame moving out of alignment relative to the centerline of the support foot.

7. The apparatus of claim 1, wherein the one or more biasing devices are configured to elastically deform when the support foot is in a lowered position on a transport surface, and wherein the biasing force operates to realign the centerline of the support foot with the orientation of the load bearing frame when the support foot is raised from the transport surface.

8. The apparatus of claim 7, wherein the lift mechanism is further configured to lift and lower the load bearing frame, wherein the one or more biasing devices are configured to elastically deform with the load bearing frame raised above the transport surface, and wherein the biasing force operates to realign the centerline of the support foot with the orientation of the load bearing frame after the load bearing frame is lowered to the transport surface.

9. An apparatus for transporting a load bearing frame, the apparatus comprising:
   a support foot;
   means for raising and lowing the support foot relative to a load bearing frame;
   a roller assembly operably coupled to the means for raising and lowering, wherein the roller assembly is positioned above the support foot;
   means for moving the load bearing frame relative to the support foot such that an angular displacement occurs between a centerline of the support foot and an orientation of the load bearing frame; and
   biasing means configured to elastically deform in response to the angular displacement, wherein the resulting elastic deformation of the biasing means provides a biasing force that operates to realign the centerline of the support foot relative to the orientation of the load bearing frame.

10. The apparatus of claim 9, wherein in response to raising the support foot, the biasing means is configured to automatically realign the centerline of the support foot relative to the orientation of the load bearing frame.

11. The apparatus of claim 9, wherein the biasing means comprises one or more torsion bars.

12. The apparatus of claim 9, wherein the load bearing frame is supported by a plurality of support feet, each of the support feet having separate biasing means for re-aligning the support feet with the orientation of the load bearing frame.

13. The apparatus of claim 9, further comprising:
   first means for linking operably coupled to both the biasing means and a first end of the support foot; and
   second means for linking operably coupled to both the biasing means and a second end of the support foot.

14. The apparatus of claim 13, wherein the biasing means comprises a torsion bar positioned between and coupled to both the first means for linking and the second means for linking.

15. The apparatus of claim 14, wherein the torsion bar is configured to undergo a torqueing force in response to the angular displacement between the centerline of the support foot relative to the orientation of the load bearing frame.

16. A method comprising:
   raising, with a lift mechanism, a load bearing frame relative to a transport surface, wherein the load bearing frame is supported above the transport surface by a support foot;
   activating a travel mechanism operably coupled to the lift mechanism, wherein a roller assembly positioned above the support foot is configured to allow for movement of the load bearing frame over the transport surface in response to activating the travel mechanism;
   angularly displacing an orientation of the load bearing frame relative to a centerline of the support foot as the load bearing frame moves over the transport surface, resulting in an elastic deformation of one or more biasing devices that creates a biasing force; and
   realigning the centerline of the support foot relative to the orientation of the load bearing frame in response to an application of the biasing force.

17. The method of claim 16, further comprising:
   lowering the support foot to the transport surface prior to angularly displacing the orientation of the load bearing frame relative to the centerline of the support foot; and
   raising the support foot from the transport surface after activating the travel mechanism, wherein the centerline of the support foot is automatically realigned relative to the orientation of the load bearing frame in response to raising the support foot.

18. The method of claim 16, further comprising:
   lowering the support foot to the transport surface, wherein the one or more biasing devices are configured to elastically deform with the support foot lowered to the transport surface and with the load bearing frame raised above the transport surface; and
   lowering the load bearing frame to the transport surface, wherein the biasing force operates to realign the centerline of the support foot with the orientation of the load bearing frame after the load bearing frame is lowered to the transport surface.

19. The method of claim 16, wherein the one or more biasing devices comprise a torsion bar, and wherein deflecting the one or more biasing devices comprises applying a torque force to the torsion bar.

20. The method of claim 19, wherein realigning the centerline of the support foot comprises applying the torque force to the support foot via one or more linking devices operably coupled to both the torsion bar and the support foot.

21. The method of claim 20, wherein the torsion bar is positioned between and operably coupled to both a first linking device and a second linking device of the one or more linking devices.

22. The method of claim 21, wherein the first linking device is operably coupled to a first end of the support foot, and wherein the second linking device is operably coupled to a second end of the support foot opposite the first end.

23. A system for moving a load bearing frame over a transport surface, the system comprising:
   a first support foot comprising a centerline;
   a first roller assembly operably coupled to the first support foot and configured to move in a first direction;
   a lift mechanism operably coupled to the roller assembly and configured to lift and lower the first support foot relative to the load bearing frame;
   a travel mechanism operably coupled to the roller assembly;
   a second support foot;

a second roller assembly operably coupled to the second support foot and configured to move in a second direction, wherein the second direction is different than the first direction, and wherein the simultaneous movement of the first roller assembly in the first direction and the second roller assembly in the second direction causes the load bearing frame to move in a spin steering mode; and one or more biasing devices, wherein in response to a non-linear displacement of the first roller assembly relative to the first support foot during the spin steering mode, an orientation of the load bearing frame moves out of alignment relative to the centerline of the first support foot, resulting in an elastic deformation of the one or more biasing devices that creates a biasing force that operates to realign the centerline of the first support foot with the orientation of the load bearing frame.

24. The system of claim 23, further comprising one or more linking devices operably coupled to both the first support foot and the one or more biasing devices.

25. The system of claim 24, wherein the one or more linking devices comprise a first linking device operably coupled to a first end of the first support foot, and a second linking device operably coupled to a second end of the first support foot opposite the first end.

26. The system of claim 25, wherein the one or more biasing devices comprise a torsion bar operably coupled to both the first linking device and the second linking device.

27. The system of claim 23, wherein in response to a non-linear displacement of the second roller assembly relative to the second support foot during the spin steering mode, the orientation of the load bearing frame moves out of alignment relative to a centerline of the second support foot, and wherein the one or more biasing devices of the second support foot creates a biasing force that operates to realign the centerline of the second support foot with the orientation of the load bearing frame.

28. The system of claim 27, wherein the one or more biasing devices are configured to elastically deform with both the first support foot and the second support foot lowered to the transport surface, and wherein the one or more biasing devices are configured to realign the centerlines of the first support foot and the second support foot with the orientation of the load bearing frame when both the first support foot and the second support foot are raised from the transport surface.

29. The system of claim 28, wherein the lift mechanism is further configured to lift and lower the load bearing frame, wherein the one or more biasing devices are configured to elastically deform when the load bearing frame is in a raised position above the transport surface, and wherein the one or more biasing devices are configured to realign the centerlines of the first support foot and the second support foot with the orientation of the load bearing frame after the load bearing frame is lowered to the transport surface.

* * * * *